US012578443B2

(12) United States Patent (10) Patent No.: US 12,578,443 B2
Boloorian (45) Date of Patent: Mar. 17, 2026

(54) DATA REFINEMENT IN OPTICAL IMAGING SYSTEMS

(71) Applicant: SiLC Technologies, Inc., Monrovia, CA (US)

(72) Inventor: Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 954 days.

(21) Appl. No.: 17/727,731

(22) Filed: Apr. 23, 2022

(65) Prior Publication Data

US 2023/0341530 A1      Oct. 26, 2023

(51) Int. Cl.
G01S 7/4915          (2020.01)
G01S 7/497          (2006.01)
(Continued)

(52) U.S. Cl.
CPC ........... G01S 7/4915 (2013.01); G01S 7/497 (2013.01); G01S 17/58 (2013.01); G01S 17/89 (2013.01)

(58) Field of Classification Search
CPC .......... G01S 17/89; G01S 17/88; G01S 17/34; G01S 17/08; G01S 7/497; G01S 17/58; G01S 7/4915; G01N 29/46
See application file for complete search history.

(56) References Cited

U.S. PATENT DOCUMENTS

| | | |
|---|---|---|
| 4,168,906 A | 9/1979 | Schwiesow |
| 4,262,993 A | 4/1981 | Burns et al. |

(Continued)

FOREIGN PATENT DOCUMENTS

| | | |
|---|---|---|
| CN | 1668939 A | 9/2005 |
| CN | 101356450 A | 1/2009 |

(Continued)

OTHER PUBLICATIONS

Aalto, Timo eta l., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

(Continued)

*Primary Examiner* — Yuqing Xiao
*Assistant Examiner* — Andrea Maria Baca
(74) *Attorney, Agent, or Firm* — Gavrilovich, Dodd & Lindsey LLP

(57)          ABSTRACT

The imaging system is configured to output a system output signal during multiple associated data periods. A pattern of a frequency of the system output signal as a function of time is repeated during each of the associated data periods. The LIDAR system includes a light-combiner that combines light that returns to the LIDAR system from the system output signal with light from a reference signal so as to generate beating signals that are each beating at a beat frequency. Each of the beat frequencies is associated with a different one of the data periods. The system also includes electronics that calculate averaged frequencies that are each an average of multiple different beat frequencies and each of the averaged frequencies is associated with a different one of the data periods. The electronics calculate LIDAR data from the average frequencies. The LIDAR data indicates a radial velocity and/or distance between the system and an object outside of the system.

16 Claims, 15 Drawing Sheets

(51) Int. Cl.
*G01S 17/58* (2006.01)
*G01S 17/89* (2020.01)

(56) References Cited

U.S. PATENT DOCUMENTS

| | | | |
|---|---|---|---|
| 4,472,020 A | 9/1984 | Evanchuk |
| 4,523,803 A | 6/1985 | Arao et al. |
| 4,721,385 A | 1/1988 | Jelalian et al. |
| 4,786,132 A | 11/1988 | Gordon |
| 4,845,703 A | 7/1989 | Suzuki |
| 4,914,665 A | 4/1990 | Sorin |
| 4,955,028 A | 9/1990 | Alfeness et al. |
| 4,987,832 A | 1/1991 | Klink et al. |
| 4,995,720 A | 2/1991 | Amzajerdian |
| 5,041,832 A | 8/1991 | Gulczynski |
| 5,194,906 A | 3/1993 | Kimura et al. |
| 5,289,252 A | 2/1994 | Nourrcier |
| 5,305,412 A | 4/1994 | Paoli |
| 5,323,223 A | 6/1994 | Hayes |
| 5,396,328 A | 3/1995 | Jestel et al. |
| 5,500,910 A | 3/1996 | Boudreau et al. |
| 5,847,816 A | 12/1998 | Zediker et al. |
| 5,889,490 A | 3/1999 | Wachter et al. |
| 5,953,468 A | 9/1999 | Finnila et al. |
| 5,977,538 A | 11/1999 | Unger et al. |
| 5,995,810 A | 11/1999 | Karasawa |
| 6,035,083 A | 3/2000 | Brennan, III et al. |
| 6,040,898 A | 3/2000 | Mrosik et al. |
| 6,108,472 A | 8/2000 | Rickman et al. |
| 6,400,500 B1 | 6/2002 | Tidmarsh et al. |
| 6,480,513 B1 | 11/2002 | Kapany et al. |
| 6,556,759 B2 | 4/2003 | Roberts et al. |
| 6,567,573 B1 | 5/2003 | Domash et al. |
| 6,687,010 B1 | 2/2004 | Horri et al. |
| 6,921,490 B1 | 7/2005 | Qian et al. |
| 6,959,133 B2 | 10/2005 | Vancoill et al. |
| 6,970,621 B1 | 11/2005 | Fried |
| 6,977,502 B1 | 12/2005 | Hertz |
| 7,345,744 B2 | 3/2008 | Halmos et al. |
| 7,375,877 B1 | 5/2008 | Di Teodoro et al. |
| 7,535,390 B2 | 5/2009 | Hsu |
| 7,907,333 B2 | 3/2011 | Coyle |
| 8,165,433 B2 | 4/2012 | Jenkins et al. |
| 8,213,751 B1 | 7/2012 | Ho et al. |
| 8,311,374 B2 | 11/2012 | Hochberg et al. |
| 8,326,100 B2 | 12/2012 | Chen et al. |
| 8,410,566 B2 | 4/2013 | Qian et al. |
| 8,541,744 B1 | 9/2013 | Liu |
| 8,558,993 B2 | 10/2013 | Newbury et al. |
| 8,885,678 B1 | 11/2014 | Kupershmidt |
| 9,157,790 B2 | 10/2015 | Shpunt et al. |
| 9,176,282 B2 | 11/2015 | Pottier et al. |
| 9,217,831 B1 | 12/2015 | Asghari |
| 9,235,097 B2 | 1/2016 | Meade et al. |
| 9,310,471 B2 | 4/2016 | Sayyah et al. |
| 9,310,487 B2 | 4/2016 | Sakimura et al. |
| 9,519,052 B2 | 12/2016 | Gusev |
| 9,575,341 B2 | 2/2017 | Heck et al. |
| 9,606,234 B2 | 3/2017 | Major, Jr. et al. |
| 9,625,580 B2 | 4/2017 | Kotelnikov et al. |
| 9,735,885 B1 | 8/2017 | Sayyah et al. |
| 9,740,079 B1 | 8/2017 | Davids et al. |
| 9,748,726 B1 | 8/2017 | Morton et al. |
| 9,753,351 B2 | 9/2017 | Eldada |
| 9,778,363 B2 | 10/2017 | Kadambi et al. |
| 9,798,166 B1 | 10/2017 | Sharma et al. |
| 9,823,118 B2 | 11/2017 | Doylend et al. |
| 9,841,495 B2 | 12/2017 | Campbell et al. |
| 9,851,443 B2 | 12/2017 | Chen |
| 9,857,468 B1 | 1/2018 | Eichenholz et al. |
| 9,893,737 B1 | 2/2018 | Keramat et al. |
| 10,003,168 B1 | 6/2018 | Villeneuve |
| 10,007,060 B1 | 6/2018 | Qian et al. |
| 10,094,916 B1 | 10/2018 | Droz et al. |
| 10,137,903 B2 | 11/2018 | Tascione et al. |
| 10,222,474 B1 | 3/2019 | Raring et al. |
| 10,274,599 B2 | 4/2019 | Schmalenberg |
| 10,281,322 B2 | 5/2019 | Doylend et al. |
| 10,345,447 B1 | 7/2019 | Hicks |
| 10,345,497 B2 | 7/2019 | Wu et al. |
| 10,397,019 B2 | 8/2019 | Hartung et al. |
| 10,564,268 B2 | 2/2020 | Turbide et al. |
| 10,605,901 B2 | 3/2020 | Lee et al. |
| 10,627,496 B2 | 4/2020 | Schmalenberg et al. |
| 10,649,306 B2 | 5/2020 | Skirlo et al. |
| 10,739,256 B1 | 8/2020 | Rickman et al. |
| 10,761,195 B2 | 9/2020 | Donovan |
| 10,782,782 B1 | 9/2020 | DeSalvo et al. |
| 10,788,582 B2 | 9/2020 | Feng et al. |
| 10,816,649 B1 | 10/2020 | Keyser et al. |
| 10,845,480 B1 | 11/2020 | Shah et al. |
| 10,901,074 B1 | 1/2021 | Pan et al. |
| 10,962,713 B2 | 3/2021 | Lee |
| 11,022,683 B1 | 6/2021 | Rezk |
| 11,067,668 B1 | 7/2021 | Bravo |
| 11,114,815 B1 | 9/2021 | Chen et al. |
| 11,119,219 B1 | 9/2021 | LaChapelle et al. |
| 11,162,789 B2 | 11/2021 | Lodin et al. |
| 11,170,476 B1 | 11/2021 | Toshiwal et al. |
| 11,175,388 B1 | 11/2021 | Wood et al. |
| 11,221,404 B1 | 1/2022 | DeSalvo et al. |
| 11,300,683 B2 | 4/2022 | Bao et al. |
| 11,378,691 B2 | 7/2022 | Boloorian et al. |
| 11,448,729 B2 | 9/2022 | Baba et al. |
| 11,454,724 B2 | 9/2022 | Michaels et al. |
| 11,486,975 B1 | 11/2022 | Xiao |
| 11,493,753 B1 | 11/2022 | Wood et al. |
| 11,525,916 B2 | 12/2022 | Avci et al. |
| 11,536,805 B2 | 12/2022 | Asghari et al. |
| 11,579,300 B1 | 2/2023 | Li |
| 11,635,491 B2 | 4/2023 | Asghari et al. |
| 11,714,167 B2 | 8/2023 | Feng et al. |
| 11,768,419 B1 | 9/2023 | Schroder et al. |
| 11,815,720 B1 | 11/2023 | Tavallaee et al. |
| 11,860,304 B2 | 1/2024 | Ren et al. |
| 11,908,075 B2 | 2/2024 | Gorantla |
| 2002/0031304 A1 | 3/2002 | Roberts et al. |
| 2002/0105632 A1 | 8/2002 | Holton |
| 2002/0122398 A1 | 9/2002 | Jou |
| 2002/0159700 A1 | 10/2002 | Coroy et al. |
| 2003/0030582 A1 | 2/2003 | Vickers |
| 2003/0031407 A1 | 2/2003 | Weisberg et al. |
| 2003/0142943 A1 | 7/2003 | Yegnanarayanan et al. |
| 2003/0183603 A1 | 10/2003 | Forsman et al. |
| 2003/0212520 A1 | 11/2003 | Campos et al. |
| 2003/0231686 A1 | 12/2003 | Liu |
| 2004/0081388 A1 | 4/2004 | Koyama |
| 2004/0085612 A1 | 5/2004 | Livingston et al. |
| 2004/0233964 A1 | 11/2004 | Yamanaka et al. |
| 2004/0249561 A1 | 12/2004 | Capozzi et al. |
| 2005/0123227 A1 | 6/2005 | Vonsovici et al. |
| 2005/0135730 A1 | 6/2005 | Welch et al. |
| 2005/0213103 A1 | 9/2005 | Everett et al. |
| 2005/0219068 A1 | 10/2005 | Jones et al. |
| 2005/0237617 A1 | 10/2005 | Carr et al. |
| 2005/0244103 A1 | 11/2005 | Kwakernaak |
| 2006/0114447 A1 | 6/2006 | Harris et al. |
| 2006/0232763 A1 | 10/2006 | Jokinen |
| 2007/0024849 A1 | 2/2007 | Carrig et al. |
| 2007/0024956 A1 | 2/2007 | Coyle |
| 2007/0036486 A1 | 2/2007 | Miyadera et al. |
| 2007/0103362 A1 | 5/2007 | Arikan et al. |
| 2007/0171407 A1 | 7/2007 | Cole et al. |
| 2007/0223856 A1 | 9/2007 | Nunoya et al. |
| 2008/0088184 A1 | 4/2008 | Tung et al. |
| 2008/0123170 A1 | 5/2008 | Reichert et al. |
| 2008/0174461 A1 | 7/2008 | Hsu |
| 2008/0176681 A1 | 7/2008 | Donahoe |
| 2008/0181550 A1 | 7/2008 | Earnshaw |
| 2008/0205461 A1 | 8/2008 | Henrichs |
| 2009/0046746 A1 | 2/2009 | Munroe et al. |
| 2009/0128797 A1 | 5/2009 | Walsh |
| 2009/0195769 A1 | 8/2009 | Luo et al. |
| 2009/0279070 A1 | 11/2009 | Ueno |

(56) References Cited

U.S. PATENT DOCUMENTS

| 2009/0309782 A1 | 12/2009 | Takabayashi et al. |
| 2010/0027379 A1 | 2/2010 | Saulnier et al. |
| 2010/0085992 A1 | 4/2010 | Rakuljic et al. |
| 2010/0159858 A1 | 6/2010 | Dent et al. |
| 2010/0187442 A1 | 7/2010 | Hochberg et al. |
| 2010/0271614 A1 | 10/2010 | Albuquerque et al. |
| 2010/0277714 A1 | 11/2010 | Pedersen et al. |
| 2010/0280765 A1 | 11/2010 | Marquardt et al. |
| 2010/0296077 A1 | 11/2010 | Scott et al. |
| 2010/0309391 A1 | 12/2010 | Plut |
| 2011/0026643 A1 | 2/2011 | Ruelke et al. |
| 2011/0068425 A1 | 3/2011 | Liao et al. |
| 2011/0068426 A1 | 3/2011 | Zheng et al. |
| 2011/0091155 A1 | 4/2011 | Yilmaz et al. |
| 2011/0095167 A1 | 4/2011 | Feng et al. |
| 2011/0141471 A1 | 6/2011 | Schlotterbeck et al. |
| 2011/0164845 A1 | 7/2011 | Jenkins et al. |
| 2011/0241895 A1 | 10/2011 | Griffin |
| 2012/0038506 A1 | 2/2012 | Kanamoto et al. |
| 2012/0062230 A1 | 3/2012 | Vaughan, Jr. et al. |
| 2012/0081786 A1 | 4/2012 | Mizuyama et al. |
| 2012/0098935 A1 | 4/2012 | Schmidt et al. |
| 2012/0120382 A1 | 5/2012 | Silny et al. |
| 2012/0182544 A1 | 7/2012 | Asahara et al. |
| 2012/0206712 A1 | 8/2012 | Chang et al. |
| 2013/0044309 A1 | 2/2013 | Dakin et al. |
| 2013/0044311 A1 | 2/2013 | Rakuljic |
| 2013/0051655 A1 | 2/2013 | Collard et al. |
| 2013/0056623 A1 | 3/2013 | Lipson et al. |
| 2013/0083389 A1 | 4/2013 | Dakin et al. |
| 2013/0094074 A1 | 4/2013 | Asghari et al. |
| 2013/0162976 A1 | 6/2013 | Dakin et al. |
| 2013/0206967 A1 | 8/2013 | Shpunt et al. |
| 2013/0242400 A1 | 9/2013 | Chen |
| 2013/0321791 A1 | 12/2013 | Feldkhun et al. |
| 2014/0035776 A1 | 2/2014 | Sochen et al. |
| 2014/0036252 A1 | 2/2014 | Amzajerdian et al. |
| 2014/0054451 A1 | 2/2014 | Abedin et al. |
| 2014/0112357 A1 | 4/2014 | Abedin et al. |
| 2014/0133864 A1 | 5/2014 | Asghari et al. |
| 2014/0153931 A1 | 6/2014 | Doerr |
| 2014/0169392 A1 | 6/2014 | Kim |
| 2014/0211298 A1 | 7/2014 | Sayyah et al. |
| 2014/0269790 A1 | 9/2014 | Sebastian et al. |
| 2014/0332918 A1 | 11/2014 | Li et al. |
| 2014/0376000 A1 | 12/2014 | Swanson et al. |
| 2014/0376001 A1 | 12/2014 | Swanson |
| 2015/0055115 A1 | 2/2015 | Pedersen et al. |
| 2015/0056740 A1 | 2/2015 | Menezo |
| 2015/0109603 A1 | 4/2015 | Kim et al. |
| 2015/0171593 A1 | 6/2015 | Duan et al. |
| 2015/0177367 A1 | 6/2015 | Sebastian et al. |
| 2015/0177383 A1 | 6/2015 | Ruff et al. |
| 2015/0185244 A1 | 7/2015 | Inoue et al. |
| 2015/0207296 A1 | 7/2015 | Rickman et al. |
| 2015/0333480 A1 | 11/2015 | Santis et al. |
| 2015/0346340 A1 | 12/2015 | Yaacobi et al. |
| 2015/0378012 A1 | 12/2015 | Sayyah et al. |
| 2015/0378187 A1 | 12/2015 | Heck et al. |
| 2016/0084945 A1 | 3/2016 | Rodrigo et al. |
| 2016/0161600 A1 | 6/2016 | Eldada et al. |
| 2016/0170141 A1 | 6/2016 | Luo et al. |
| 2016/0209594 A1 | 7/2016 | Bahl |
| 2016/0223663 A1 | 8/2016 | Schmalenberg et al. |
| 2016/0261091 A1 | 9/2016 | Santis et al. |
| 2016/0274226 A1 | 9/2016 | Lewis |
| 2016/0290891 A1 | 10/2016 | Feng et al. |
| 2016/0291135 A1 | 10/2016 | Ando et al. |
| 2016/0299228 A1 | 10/2016 | Maleki et al. |
| 2016/0306043 A1 | 10/2016 | Moss et al. |
| 2016/0324438 A1 | 11/2016 | Halpern et al. |
| 2016/0341818 A1 | 11/2016 | Gilliland et al. |
| 2016/0373191 A1 | 12/2016 | Fathololoumi et al. |
| 2016/0377721 A1 | 12/2016 | Lardin et al. |
| 2016/0377722 A1 | 12/2016 | Lardin et al. |
| 2017/0003451 A1 | 1/2017 | Ma et al. |
| 2017/0040775 A1 | 2/2017 | Takabayashi et al. |
| 2017/0059779 A1 | 3/2017 | Okayama |
| 2017/0067985 A1 | 3/2017 | Schwarz et al. |
| 2017/0098917 A1 | 4/2017 | Popovic et al. |
| 2017/0108649 A1 | 4/2017 | Dallessasse et al. |
| 2017/0139411 A1 | 5/2017 | Hartung et al. |
| 2017/0146639 A1 | 5/2017 | Carothers |
| 2017/0146641 A1 | 5/2017 | Walsh et al. |
| 2017/0153319 A1 | 6/2017 | Villeneuve et al. |
| 2017/0155225 A1 | 6/2017 | Villeneuve et al. |
| 2017/0184450 A1 | 6/2017 | Doylend et al. |
| 2017/0207600 A1 | 7/2017 | Klamkin et al. |
| 2017/0268866 A1 | 9/2017 | Berz |
| 2017/0269198 A1 | 9/2017 | Hall et al. |
| 2017/0269215 A1 | 9/2017 | Hall et al. |
| 2017/0299697 A1 | 10/2017 | Swanson |
| 2017/0307648 A1 | 10/2017 | Kotake et al. |
| 2017/0307736 A1 | 10/2017 | Donovan |
| 2017/0328988 A1 | 11/2017 | Magee et al. |
| 2017/0343652 A1 | 11/2017 | de Mersseman et al. |
| 2017/0343791 A1 | 11/2017 | Swanson |
| 2017/0350965 A1 | 12/2017 | Schmalenberg |
| 2017/0350983 A1 | 12/2017 | Hall et al. |
| 2017/0356983 A1 | 12/2017 | Jeong et al. |
| 2017/0371227 A1 | 12/2017 | Skirlo et al. |
| 2017/0372602 A1 | 12/2017 | Gilliland et al. |
| 2018/0002432 A1 | 1/2018 | Gilliland et al. |
| 2018/0003805 A1 | 1/2018 | Popovich et al. |
| 2018/0024246 A1 | 1/2018 | Jeong et al. |
| 2018/0031680 A1 | 2/2018 | Lee et al. |
| 2018/0039154 A1 | 2/2018 | Hashemi et al. |
| 2018/0050704 A1 | 2/2018 | Tascione et al. |
| 2018/0073932 A1 | 3/2018 | Minet et al. |
| 2018/0088211 A1 | 3/2018 | Gill et al. |
| 2018/0095284 A1 | 4/2018 | Welch et al. |
| 2018/0102442 A1 | 4/2018 | Wang et al. |
| 2018/0103431 A1 | 4/2018 | Suh et al. |
| 2018/0113216 A1 | 4/2018 | Kremer et al. |
| 2018/0120433 A1 | 5/2018 | Eichenholz et al. |
| 2018/0120436 A1 | 5/2018 | Smits |
| 2018/0136321 A1 | 5/2018 | Verghese et al. |
| 2018/0143322 A1 | 5/2018 | Rosenzweig et al. |
| 2018/0143374 A1 | 5/2018 | Coolbaugh et al. |
| 2018/0149752 A1 | 5/2018 | Tadano |
| 2018/0164408 A1 | 6/2018 | Hall et al. |
| 2018/0172918 A1 | 6/2018 | Lane et al. |
| 2018/0188371 A1 | 7/2018 | Bao et al. |
| 2018/0217471 A1 | 8/2018 | Lee et al. |
| 2018/0224547 A1 | 8/2018 | Crouch et al. |
| 2018/0231643 A1 | 8/2018 | Lee et al. |
| 2018/0269890 A1 | 9/2018 | Ojeda |
| 2018/0287343 A1 | 10/2018 | Morrison et al. |
| 2018/0306925 A1 | 10/2018 | Hosseini et al. |
| 2018/0329037 A1 | 11/2018 | Bozchalooi et al. |
| 2018/0331493 A1 | 11/2018 | Lin et al. |
| 2018/0348343 A1 | 12/2018 | Achour et al. |
| 2018/0351317 A1 | 12/2018 | Vermeulen |
| 2018/0356344 A1 | 12/2018 | Yi |
| 2018/0356522 A1 | 12/2018 | Kikuchi et al. |
| 2018/0359033 A1 | 12/2018 | Xu et al. |
| 2018/0364334 A1 | 12/2018 | Xiang et al. |
| 2018/0364336 A1 | 12/2018 | Hosseini et al. |
| 2018/0372517 A1 | 12/2018 | Yao et al. |
| 2018/0372530 A1 | 12/2018 | Welle et al. |
| 2018/0372870 A1 | 12/2018 | Puglia |
| 2018/0375284 A1 | 12/2018 | Permogorov |
| 2019/0004151 A1 | 1/2019 | Abediasl et al. |
| 2019/0011558 A1 | 1/2019 | Crouch et al. |
| 2019/0011559 A1 | 1/2019 | Desai et al. |
| 2019/0018110 A1 | 1/2019 | Kremer et al. |
| 2019/0018121 A1 | 1/2019 | Sayyah et al. |
| 2019/0018139 A1 | 1/2019 | Sayyah et al. |
| 2019/0018140 A1 | 1/2019 | Sarkissian et al. |
| 2019/0018144 A1 | 1/2019 | Imaki et al. |
| 2019/0018197 A1 | 1/2019 | Boutami et al. |
| 2019/0025094 A1 | 1/2019 | Lewis et al. |
| 2019/0025426 A1 | 1/2019 | Satyan et al. |
| 2019/0025431 A1 | 1/2019 | Satyan et al. |

(56) References Cited

U.S. PATENT DOCUMENTS

| | | |
|---|---|---|
| 2019/0027897 A1 | 1/2019 | Wei et al. |
| 2019/0033453 A1 | 1/2019 | Crouch et al. |
| 2019/0049569 A1 | 2/2019 | Kim et al. |
| 2019/0064329 A1 | 2/2019 | Liu et al. |
| 2019/0064332 A1 | 2/2019 | Schmalenberg et al. |
| 2019/0064358 A1 | 2/2019 | Desai et al. |
| 2019/0072651 A1 | 3/2019 | Halmos et al. |
| 2019/0072672 A1 | 3/2019 | Yao |
| 2019/0086514 A1 | 3/2019 | Dussan et al. |
| 2019/0086518 A1 | 3/2019 | Halstig et al. |
| 2019/0086550 A1 | 3/2019 | Dussan et al. |
| 2019/0096259 A1 | 3/2019 | McQuillen et al. |
| 2019/0101647 A1 | 4/2019 | Feshali et al. |
| 2019/0107623 A1 | 4/2019 | Campbell et al. |
| 2019/0120939 A1 | 4/2019 | O'Keeffe |
| 2019/0146074 A1 | 5/2019 | Hjelmstad |
| 2019/0146087 A1 | 5/2019 | Mansur et al. |
| 2019/0146164 A1 | 5/2019 | Krichevsky |
| 2019/0154816 A1 | 5/2019 | Hughes et al. |
| 2019/0154832 A1 | 5/2019 | Maleki et al. |
| 2019/0154835 A1 | 5/2019 | Maleki et al. |
| 2019/0179012 A1 | 6/2019 | Heo |
| 2019/0187269 A1 | 6/2019 | Tong et al. |
| 2019/0204419 A1 | 7/2019 | Baba et al. |
| 2019/0204441 A1 | 7/2019 | Feneyrou et al. |
| 2019/0204443 A1 | 7/2019 | Yao et al. |
| 2019/0250253 A1 | 8/2019 | Hung et al. |
| 2019/0250396 A1 | 8/2019 | Blanche et al. |
| 2019/0257924 A1 | 8/2019 | Li et al. |
| 2019/0257927 A1 | 8/2019 | Yao |
| 2019/0266741 A1 | 8/2019 | Uehara |
| 2019/0280453 A1 | 9/2019 | Gopinath et al. |
| 2019/0293794 A1 | 9/2019 | Zhang et al. |
| 2019/0302262 A1 | 10/2019 | Singer |
| 2019/0302268 A1 | 10/2019 | Singer et al. |
| 2019/0310372 A1 | 10/2019 | Crouch et al. |
| 2019/0310377 A1 | 10/2019 | Lodin et al. |
| 2019/0317195 A1 | 10/2019 | Sun et al. |
| 2019/0331797 A1 | 10/2019 | Singer et al. |
| 2019/0339388 A1 | 11/2019 | Crouch et al. |
| 2019/0339389 A1 | 11/2019 | Russo et al. |
| 2019/0341739 A1 | 11/2019 | Loh et al. |
| 2019/0346056 A1 | 11/2019 | Staiger et al. |
| 2019/0346568 A1 | 11/2019 | Feng et al. |
| 2019/0353787 A1 | 11/2019 | Petit |
| 2019/0353789 A1 | 11/2019 | Boloorian et al. |
| 2019/0353977 A1 | 11/2019 | Hung |
| 2019/0361122 A1 | 11/2019 | Crouch et al. |
| 2019/0369244 A1 | 12/2019 | Asghari et al. |
| 2019/0369251 A1 | 12/2019 | Feng et al. |
| 2019/0372307 A1 | 12/2019 | Morton |
| 2019/0383907 A1 | 12/2019 | Belsley et al. |
| 2019/0391242 A1 | 12/2019 | Asghari et al. |
| 2019/0391243 A1 | 12/2019 | Nicolaescu |
| 2020/0018857 A1 | 1/2020 | Feng et al. |
| 2020/0021082 A1 | 1/2020 | Rakuljic |
| 2020/0025898 A1 | 1/2020 | Ain-Kedem et al. |
| 2020/0025926 A1 | 1/2020 | Asghari et al. |
| 2020/0043176 A1 | 2/2020 | Maila et al. |
| 2020/0049799 A1 | 2/2020 | Ando et al. |
| 2020/0057143 A1 | 2/2020 | Asghari et al. |
| 2020/0064116 A1 | 2/2020 | Salvade et al. |
| 2020/0064477 A1 | 2/2020 | Komatsuzaki |
| 2020/0072978 A1 | 3/2020 | Boloorian et al. |
| 2020/0072979 A1 | 3/2020 | Boloorian et al. |
| 2020/0076152 A1 | 3/2020 | Eichenholz et al. |
| 2020/0088876 A1 | 3/2020 | Tanemura et al. |
| 2020/0103501 A1 | 4/2020 | Kotelnikov et al. |
| 2020/0104647 A1 | 4/2020 | Pirim |
| 2020/0110179 A1 | 4/2020 | Talty et al. |
| 2020/0116837 A1 | 4/2020 | Asghari et al. |
| 2020/0116842 A1 | 4/2020 | Asghari et al. |
| 2020/0116849 A1* | 4/2020 | Wennersten ............ G01S 7/023 |
| 2020/0116863 A1 | 4/2020 | Jensen et al. |
| 2020/0132843 A1 | 4/2020 | Hart et al. |
| 2020/0142065 A1 | 5/2020 | Boloorian et al. |
| 2020/0142066 A1 | 5/2020 | Sandborn et al. |
| 2020/0142068 A1 | 5/2020 | Crouch et al. |
| 2020/0150241 A1 | 5/2020 | Byrnes et al. |
| 2020/0158830 A1 | 5/2020 | Asghari et al. |
| 2020/0158833 A1 | 5/2020 | Baba et al. |
| 2020/0158839 A1 | 5/2020 | Lin et al. |
| 2020/0166617 A1 | 5/2020 | Crouch et al. |
| 2020/0166647 A1 | 5/2020 | Crouch et al. |
| 2020/0174095 A1 | 6/2020 | Altintas et al. |
| 2020/0182973 A1 | 6/2020 | Luff et al. |
| 2020/0182978 A1 | 6/2020 | Maleki et al. |
| 2020/0200879 A1 | 6/2020 | Halstig et al. |
| 2020/0209366 A1 | 7/2020 | Maleki |
| 2020/0225332 A1 | 7/2020 | Wagner et al. |
| 2020/0241119 A1 | 7/2020 | Asghari et al. |
| 2020/0249324 A1 | 8/2020 | Steinberg et al. |
| 2020/0249350 A1 | 8/2020 | Schmalenberg |
| 2020/0256956 A1 | 8/2020 | Luff et al. |
| 2020/0278432 A1 | 9/2020 | Thorpe et al. |
| 2020/0284879 A1 | 9/2020 | Asghari et al. |
| 2020/0284883 A1 | 9/2020 | Ferreira et al. |
| 2020/0284913 A1 | 9/2020 | Amelot et al. |
| 2020/0292706 A1 | 9/2020 | Hexsel et al. |
| 2020/0300980 A1 | 9/2020 | Behzadi et al. |
| 2020/0300993 A1 | 9/2020 | Behzadi et al. |
| 2020/0301070 A1 | 9/2020 | Nagarajan |
| 2020/0309949 A1 | 10/2020 | Feng et al. |
| 2020/0309952 A1 | 10/2020 | Imaki et al. |
| 2020/0319409 A1 | 10/2020 | Su et al. |
| 2020/0326476 A1 | 10/2020 | Hiratani |
| 2020/0333441 A1 | 10/2020 | Diaz |
| 2020/0333443 A1 | 10/2020 | Boloorian et al. |
| 2020/0333533 A1 | 10/2020 | Rogers et al. |
| 2020/0363515 A1 | 11/2020 | Luff et al. |
| 2020/0379112 A1 | 12/2020 | Ujihara et al. |
| 2020/0379115 A1 | 12/2020 | Yang et al. |
| 2020/0400821 A1 | 12/2020 | Baker et al. |
| 2020/0400822 A1 | 12/2020 | Ando et al. |
| 2020/0408911 A1 | 12/2020 | Boloorian et al. |
| 2020/0408912 A1 | 12/2020 | Boloorian et al. |
| 2021/0010802 A1 | 1/2021 | Onohara et al. |
| 2021/0033732 A1 | 2/2021 | Boloorian et al. |
| 2021/0055388 A1 | 2/2021 | Feng et al. |
| 2021/0063541 A1 | 3/2021 | Zheng et al. |
| 2021/0063542 A1 | 3/2021 | Zheng et al. |
| 2021/0072385 A1 | 3/2021 | Sandborn et al. |
| 2021/0072389 A1 | 3/2021 | Boloorian et al. |
| 2021/0072445 A1 | 3/2021 | Kurokawa et al. |
| 2021/0096228 A1 | 4/2021 | Behzadi et al. |
| 2021/0109195 A1 | 4/2021 | Feng et al. |
| 2021/0116778 A1 | 4/2021 | Zhang et al. |
| 2021/0132232 A1 | 5/2021 | Asghari et al. |
| 2021/0141058 A1 | 5/2021 | Piggott et al. |
| 2021/0149056 A1 | 5/2021 | Luff et al. |
| 2021/0156999 A1 | 5/2021 | Nishino et al. |
| 2021/0159659 A1 | 5/2021 | Bandyopadhyay et al. |
| 2021/0159664 A1 | 5/2021 | Liu et al. |
| 2021/0165102 A1 | 6/2021 | Crouch et al. |
| 2021/0173058 A1 | 6/2021 | Viswanatha et al. |
| 2021/0181320 A1 | 6/2021 | Oza et al. |
| 2021/0190907 A1 | 6/2021 | Sahara |
| 2021/0190921 A1 | 6/2021 | Golikov et al. |
| 2021/0190925 A1 | 6/2021 | Asghari et al. |
| 2021/0199797 A1 | 7/2021 | Choi et al. |
| 2021/0239811 A1 | 8/2021 | Asghari et al. |
| 2021/0255324 A1 | 8/2021 | Dunn et al. |
| 2021/0278540 A1 | 9/2021 | Maayan et al. |
| 2021/0293923 A1 | 9/2021 | Arkind et al. |
| 2021/0318436 A1 | 10/2021 | Boloorian et al. |
| 2021/0325520 A1 | 10/2021 | Cai et al. |
| 2021/0333386 A1 | 10/2021 | Park et al. |
| 2021/0349196 A1 | 11/2021 | Wang et al. |
| 2021/0349216 A1 | 11/2021 | Behroozpour et al. |
| 2021/0356592 A1 | 11/2021 | Behroozpour |
| 2021/0364607 A1 | 11/2021 | Davydenko |
| 2021/0373162 A1 | 12/2021 | Wu et al. |
| 2021/0389244 A1 | 12/2021 | Bowman et al. |
| 2021/0396879 A1 | 12/2021 | Sun et al. |

(56)                References Cited

U.S. PATENT DOCUMENTS

| | | |
|---|---|---|
| 2021/0405194 A1 | 12/2021 | Tsuchida |
| 2022/0003842 A1 | 1/2022 | Wang et al. |
| 2022/0043151 A1 | 2/2022 | Baker et al. |
| 2022/0050187 A1 | 2/2022 | Yao |
| 2022/0065999 A1 | 3/2022 | Phare et al. |
| 2022/0075121 A1 | 3/2022 | Lowder et al. |
| 2022/0085567 A1 | 3/2022 | Lowder et al. |
| 2022/0099837 A1 | 3/2022 | Crouch et al. |
| 2022/0107411 A1 | 4/2022 | Koonath et al. |
| 2022/0113390 A1 | 4/2022 | Koonath et al. |
| 2022/0113422 A1 | 4/2022 | Hillard et al. |
| 2022/0121080 A1 | 4/2022 | Yao |
| 2022/0179055 A1 | 6/2022 | Ferrara et al. |
| 2022/0187457 A1 | 6/2022 | Daami et al. |
| 2022/0187458 A1 | 6/2022 | Piggott et al. |
| 2022/0187463 A1 | 6/2022 | Maheshwari et al. |
| 2022/0196814 A1 | 6/2022 | Lin et al. |
| 2022/0206164 A1 | 6/2022 | Takada |
| 2022/0244360 A1 | 8/2022 | Phare et al. |
| 2022/0283389 A1 | 9/2022 | Yang et al. |
| 2022/0291361 A1 | 9/2022 | Asghari et al. |
| 2022/0308192 A1 | 9/2022 | John et al. |
| 2022/0334225 A1 | 10/2022 | Davydenko et al. |
| 2022/0342048 A1 | 10/2022 | Asghari et al. |
| 2022/0365214 A1 | 11/2022 | Sandborn et al. |
| 2022/0373667 A1 | 11/2022 | Khatana et al. |
| 2022/0373739 A1 | 11/2022 | Abril et al. |
| 2022/0404470 A1 | 12/2022 | Asghari et al. |
| 2022/0413100 A1 | 12/2022 | Jain |
| 2022/0413143 A1 | 12/2022 | Parsa et al. |
| 2023/0027271 A1 | 1/2023 | Jin et al. |
| 2023/0069201 A1 | 3/2023 | Asghari et al. |
| 2023/0104453 A1 | 4/2023 | Asghari et al. |
| 2023/0194952 A1 | 6/2023 | Muranaka et al. |
| 2023/0228878 A1 | 7/2023 | Asghari et al. |
| 2023/0258861 A1 | 8/2023 | Vercruysse et al. |
| 2023/0288566 A1 | 9/2023 | Nadkarni et al. |
| 2023/0296732 A1 | 9/2023 | Xiao |
| 2024/0012112 A1 | 1/2024 | Warke et al. |
| 2024/0012147 A1 | 1/2024 | Tavallaee et al. |
| 2025/0085401 A1 | 3/2025 | Zhou et al. |
| 2025/0094380 A1 | 3/2025 | Mazed |

FOREIGN PATENT DOCUMENTS

| | | | |
|---|---|---|---|
| CN | 103874945 A | 6/2014 |
| CN | 104459881 A | 3/2015 |
| CN | 204479750 U | 7/2015 |
| CN | 105589074 A | 5/2016 |
| CN | 105680320 A | 6/2016 |
| CN | 105917257 A | 8/2016 |
| CN | 106154248 A | 11/2016 |
| CN | 106410607 A | 2/2017 |
| CN | 106773028 A | 5/2017 |
| CN | 106842232 A | 6/2017 |
| CN | 106959439 A | 7/2017 |
| CN | 107144847 A | 9/2017 |
| CN | 107305184 A | 10/2017 |
| CN | 107367734 A | 11/2017 |
| CN | 107976666 A | 5/2018 |
| CN | 108139465 A | 6/2018 |
| CN | 108291970 A | 7/2018 |
| CN | 108603758 A | 9/2018 |
| CN | 109254296 A | 1/2019 |
| CN | 109471129 A | 3/2019 |
| CN | 109642952 A | 4/2019 |
| CN | 110036276 A | 7/2019 |
| CN | 107192355 B | 8/2019 |
| CN | 110161516 A | 8/2019 |
| CN | 110187350 A | 8/2019 |
| CN | 110412685 A | 11/2019 |
| CN | 111338025 A | 6/2020 |
| CN | 112241014 A | 1/2021 |
| CN | 114419152 A | 4/2022 |
| CN | 110764074 B | 6/2022 |

| | | | |
|---|---|---|---|
| DE | 10 2015 222061 A1 | 5/2017 |
| DE | 10 2017 200795 A1 | 7/2018 |
| DE | 10 2018 101935 A1 | 8/2018 |
| DE | 10 2017 106 226 A1 | 9/2018 |
| DE | 102019124598 A1 | 3/2020 |
| EP | 0 523 921 A1 | 1/1993 |
| EP | 2796890 A1 | 10/2014 |
| EP | 2955542 B1 | 4/2017 |
| EP | 3276371 A1 | 1/2018 |
| EP | 3339924 A1 | 6/2018 |
| EP | 3259615 B1 | 11/2019 |
| EP | 3719537 A1 | 10/2020 |
| EP | 3 584 893 B1 | 6/2021 |
| EP | 3889644 A1 | 10/2021 |
| GB | 1 585 053 A | 2/1981 |
| GB | 2173664 A | 10/1986 |
| GB | 2586499 A | 2/2021 |
| JP | S53-123004 A | 10/1978 |
| JP | H05-158096 A | 6/1993 |
| JP | H09-33872 A | 2/1997 |
| JP | H1010227 A | 1/1998 |
| JP | 2003224321 A | 8/2003 |
| JP | 2004-151022 A | 5/2004 |
| JP | 2007184511 A | 7/2007 |
| JP | 2008160130 A | 7/2008 |
| JP | 2008292370 A | 12/2008 |
| JP | 2009-115696 A | 5/2009 |
| JP | 2010151806 A | 7/2010 |
| JP | 2010271624 A | 12/2010 |
| JP | 2012146787 A | 8/2012 |
| JP | 2013165407 A | 8/2013 |
| JP | 2014202716 A | 10/2014 |
| JP | 2015-018640 A | 1/2015 |
| JP | 2015092184 A | 5/2015 |
| JP | 2015-517094 A | 6/2015 |
| JP | 2015172540 A | 10/2015 |
| JP | 2015180735 A | 10/2015 |
| JP | 2015230259 A | 12/2015 |
| JP | 2016111087 A | 6/2016 |
| JP | 2016-525209 A | 8/2016 |
| JP | 5975203 B2 | 8/2016 |
| JP | 2017502315 A | 1/2017 |
| JP | 2017097340 A | 6/2017 |
| JP | 2017106897 A | 6/2017 |
| JP | 2017524918 A | 8/2017 |
| JP | 2017161484 A | 9/2017 |
| JP | 2017-198514 A | 11/2017 |
| JP | 2017-211348 A | 11/2017 |
| JP | 2018511054 A | 4/2018 |
| JP | 2018-512600 A | 5/2018 |
| JP | 2018520346 A | 7/2018 |
| JP | 2018529955 A | 10/2018 |
| JP | 2018188284 A | 11/2018 |
| JP | 2018200273 A | 12/2018 |
| JP | 2019502925 A | 1/2019 |
| JP | 2019095218 A | 6/2019 |
| JP | 2019525195 A | 9/2019 |
| JP | 2019-203977 A | 11/2019 |
| JP | 2019-537012 A | 12/2019 |
| JP | 2020-012641 A | 1/2020 |
| JP | 2020-16639 A | 1/2020 |
| JP | 2020-34546 A | 3/2020 |
| JP | 2002090457 A | 3/2020 |
| JP | 2020085723 A | 6/2020 |
| JP | 2021004800 A | 1/2021 |
| JP | 2021032848 A | 3/2021 |
| JP | 7397009 B2 | 12/2023 |
| KR | 20060086182 A | 7/2006 |
| KR | 10-2015-0045735 A | 4/2015 |
| KR | 20180013598 A | 2/2018 |
| KR | 101 931 022 B1 | 12/2018 |
| WO | 97/11396 A1 | 3/1997 |
| WO | 2010123182 A1 | 10/2010 |
| WO | 2010127151 A1 | 11/2010 |
| WO | 2012123668 A1 | 9/2012 |
| WO | 2012153309 A2 | 11/2012 |
| WO | 2013/049579 A1 | 4/2013 |
| WO | 2014/203654 A1 | 12/2014 |
| WO | 2014/206630 A1 | 12/2014 |

(56) References Cited

FOREIGN PATENT DOCUMENTS

| WO | 2015/044370 A1 | 4/2015 |
|---|---|---|
| WO | 2015/058209 A1 | 4/2015 |
| WO | 2015/098027 A1 | 7/2015 |
| WO | 2015/200800 A1 | 12/2015 |
| WO | 2016/024332 A1 | 2/2016 |
| WO | 2016/097409 A2 | 6/2016 |
| WO | 2017/023107 A1 | 2/2017 |
| WO | 2017/083597 A1 | 5/2017 |
| WO | 2017/095817 A1 | 6/2017 |
| WO | 2017/102156 A1 | 6/2017 |
| WO | 2017/187510 A1 | 11/2017 |
| WO | 2017/216581 A1 | 12/2017 |
| WO | 2018/003852 A1 | 1/2018 |
| WO | 2018/036946 A1 | 3/2018 |
| WO | 2018/060318 A1 | 4/2018 |
| WO | 2018/116412 A1 | 6/2018 |
| WO | 2018/160240 A2 | 9/2018 |
| WO | 2018/230474 A1 | 12/2018 |
| WO | 2019/010320 A1 | 1/2019 |
| WO | 2019/018894 A1 | 1/2019 |
| WO | 2019/121069 A1 | 6/2019 |
| WO | 2019/130472 A1 | 7/2019 |
| WO | 2019/149815 A1 | 8/2019 |
| WO | 2019/196135 A1 | 10/2019 |
| WO | 2019/217761 A1 | 11/2019 |
| WO | 2019/217857 A1 | 11/2019 |
| WO | 2019/236430 A1 | 12/2019 |
| WO | 2019/236464 A1 | 12/2019 |
| WO | 2020/005537 A1 | 1/2020 |
| WO | 2020/033161 A1 | 2/2020 |
| WO | 2020/046513 A1 | 3/2020 |
| WO | 2020/076566 A1 | 4/2020 |
| WO | 2020/110779 A1 | 6/2020 |
| WO | 2020/129284 A1 | 6/2020 |
| WO | 2020/167515 A1 | 8/2020 |
| WO | 2020/205450 A1 | 10/2020 |
| WO | 2020/234797 A1 | 11/2020 |
| WO | 2020/251633 A1 | 12/2020 |
| WO | 2021/024038 A1 | 2/2021 |
| WO | 2021/252894 A1 | 12/2021 |
| WO | 2022/013422 A1 | 1/2022 |
| WO | 2022/233503 A1 | 11/2022 |
| WO | 2023/006470 A1 | 2/2023 |
| WO | 2023/118295 A1 | 6/2023 |

OTHER PUBLICATIONS

Anderson et al., "Iadar: Frequency-Modulated Continuous Wave Laser Detection and Ranging", Photogrammetric Engineering & Remote Sensing, vol. 83, No. 11, Nov. 2017.

Baghmisheh, B. B., "Chip-scale Lidar", Jan. 19, 2017, Electrical Engineering and Computer Sciences University of California, Berkeley.

Behroozpour et al., "Electronic-Photonic Integrated Circulator 3D Microimaging", IEEE Journal of Solid-State Circuits, Jan. 2017, vol. 52, No. 1, pp. 161-172.

Behroozpour, B. et al., "Lidar System Architectures and Circuits," IEEE Communications Magazine, Oct. 2017, pp. 135-142.

Carter et al., "Lidar 101: An Introduction to Lidar Technology, Data, and Applications", Nov. 2012, NOAA Coastal Services Center, 76 pages.

Chan, M.K, "Atmospheric transmission windows for high energy short pulse lasers", Thesis, Naval Postgraduate School, Dec. 2003.

Conditional Euclidean Clustering, retrieved on Jul. 9, 2022 from https://pcl.readthedocs.io/projects/tutorials/en/latest/cluster_extraction. html#cluster-extraction.

Cooksey, Catherine C. et al., "Reflectance measurements of human skin from the ultraviolet to the shortwave infrared (250 nm to 2500 nm)", May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. "Solid state absorption attenuator in silicon-on-insulator with MHz bandwidth.", Integrated Photonics Research 2002, Vancouver, Canada, Jul. 17-19, 2002 (Optica Publishing Group, 2002), paper IFA5, 3 pages.

Doylend, J. K., "Two-dimensional free-space beam steering with an optical phased array on silicon-on-insulator", Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_ clustering.html.

Gao, S. and Hui, R., "4. Frequency-modulated continuous-wave lidar using I/Q modulator for simplified heterodyne detection", Optics Letter, vol. 37, No. 11, Jun. 1, 2012, pp. 2022-2024.

Gemfire Corporation, "8-Channel Cyclic (Colorless) Arrayed Waveguide Grating (AWG)", (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., "Speckle Phenomena in Optics Theory and Applications", Roberts and Company, Sep. 28, 2007, 130(2), pp. 413-414.

Gulati, et al., "A Low-Power Reconfigurable Analog-to-Digital Converter", IEEE Journal of Solid-State Circuits, Dec. 2001, vol. 36, No. 12, pp. 1900-1911.

Guo et al., "Beat-frequency adjustable Er3+-doped DBR fiber laser for ultrasound detection", Optics Express, Jan. 31, 2011, vol. 19, No. 3, pp. 2485-2492.

Haran, T., "Short-wave infrared diffuse reflectance of Textile Materials", Thesis, Georgia State University, 2008.

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.

Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.

Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.

Kaasalainen, S., "The multispectral journey of Lidar", Retrieved from GIM International: https://www.gim-international.com/content/article/the-multispectral-journey-of-lidar, Jan. 24, 2019.

Kelly et al., "Discrete mode laser diodes with ultra narrow linewidthe emission" Feb. 2007, Electronics Letters, vol. 43, 2 pgs.

Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.

Komljenovic et al., "Widely-Tunable Ring-Resonator Semiconductor Lasers", Review, Jul. 17, 2017, 21 pages.

Kotthaus, S., et al., "Derivation of an urban materials spectral library through emittance and reflectance spectroscopy", ISPRS Journal of Photogrammetry and Remote Sensing, Aug. 2014, vol. 94, 194-212.

Kumar et al., "Intra-data center interconnects, networking, and architectures", Coherent Detection, Optical Fiber Telecommunications VII, Oct. 25, 2019, Science Direct, pp. 627-672.

Li, L., "Time-of-Flight Camera—An Introduction", 2014, TI Technical White Paper, SLOA190B.

Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.

Lu, Z., "Silicon Photonic Switches for Optical Communication Applications", PhD Thesis. University of British Columbia, Sep. 29, 2017, 165 pages.

Nevlacsil et al., "Multi-channel swept source optical coherence tomography concept based on photonic integrated circuits", Optics Express, Oct. 26, 2020, vol. 28, No. 22, pp. 32468-32482.

PDB450C—Switchable Gain Balanced Amp. Photodetector, InGaAs. (n.d.). Retrieved from Thorlabs: https://www.thorlabs.com/thorproduct. cfm?partnumber=PDB450C.

Pfennigbauer, M. et al., "Multi-Wavelength Airborne Laser Scanning", ILMF 2011. New Orleans, Feb. 7-9, 2011.

PI Motion/Positioning, 2018, Retrieved from PI USA: http://www.pi-usa.us/products/PDF_Data/Q-522_Mini_Positioning_Stage_ 20150203.pdf.

(56) References Cited

OTHER PUBLICATIONS

PI USA: Fast Tip/Tilt Platform, 2018, Retrieved from PI USA Active Optics: http://www.pi-usa.us/products/PDF_Data/S335_Fast_Tip-Tilt_Platform.pdf.

Pierrottet et al., "Linear FMCW Laser Radar for Precision Range and Vector Velocity Measurements", MRS Online Proceeding Library Archive, Jan. 2008, pp. 1-9.

Pilot Photonics, Lyra OCS 1000, Optical comb laser module, Retrieved on Nov. 20, 2019 from Pilot Photonics: http://www.pilotphotonics.com/optical-frequency-comb-source/.

Poulton, C. V. MSC Thesis, "Integrated LIDAR with Optical Phased Arrays in Silicon Photonics", Massachusetts Institute of Technology, Sep. 2016, pp. 95-101.

Poulton, Christopher V. et al., "Coherent Solid-State LIDAR with Silicon Photonic Optical Phased Arrays", pp. 4091-4094, Oct. 15, 2017, Optics Letters, vol. 42, No. 20.

Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).

Royo et al., "An Overview of LIDAR Imaging Systems for Autonomous Vehicles", Appl. Sci., Sep. 30, 2019, 9(19):4093, 37 pages. https://doi.org/10.3390/app9194093.

Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.

Sandborn, Phillip Alan McGinnis, "FMCW Lidar: Scaling to the Chip-Level and Improving Phase-Noise-Limited Performance", Fall 2017, 18 pages.

Satyan, N. et al., "Precise control of broadband frequency chirps using optoelectronic feedback," Optics Express, Aug. 31, 2009, vol. 17, No. 18, pp. 15991-15999.

Schulmeister, Karl, "White Paper The new edition of the international laser product safety standard", IEC 60825-1, 2014.

Self, "Focusing of spherical Gaussian beams", Applied Optics, Mar. 1, 1983, vol. 22, No. 5, pp. 658-661.

Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.

Smit, Meint K. C. v., "Phasar-Based WDM-Devices: Principles, Design and Applications", IEEE Journal of Selected Topics in Quantum Electronics, Jan. 1, 1996, 2(2), 236-250.

Soref, Richard A. et al. "Electrooptical Effects in Silicon", IEEE Journal of Quantum Electronics, vol. QE-23, No. 1, Jan. 1987, pp. 123-129.

Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.

Sun, J., et al., "Large-scale silicon photonic circuits for optical phased arrays," vol. 20, No. 4, Jul./Aug. 2014. IEEE Journal of Selected Topics in Quantum Electronics.

"The Demultiplexer" accessed from www.electronics-tutorials.ws/combination/comb_3.html with WayBack Machine dated Feb. 9, 2008, 2 pages.

Van Acoleyen et al., "Off-chip beam steering with a one-dimensional optical phased array on silicon-on-insulator", Apr. 2009, Opt. Lett., 34(9) 1477-1479.

Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.

Vasilyev, A. et al., "The Optoelectronic Swept-Frequency Laser and Its Applications in Ranging, Three-Dimensional Imaging, and Coherent Beam Combining of Chirped-Seed Amplifiers," CaltechTHESIS, May 20, 2013, 177 pages.

Velodyne, "HDL-64E S2 Datasheet. Retrieved from http://velodynelidar.com/lidar/products/brochure/HDL-64E%20S2%20datasheet_2010_lowres.pdf", 2017.

Wang et al., "Automotive FMCW Radar-enhanced Range Estimation via a Local Resampling Fourier Transform", International Journal of Advanced Robotic Systems, May 15, 2016, pp. 1-8.

Wikipedia, Optical Attenuator, 2022, 3 pages.

Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.

Wojtkiewicz et al., "Two-dimensional signal processing in FMCW radars", National Conference on Circuit Theory and Electronic Networks, vol. 2, Oct. 1997, pp. 1-6.

Zhu et al., "Dual-Comb Ranging", Engineering, 4, Oct. 16, 2018, pp. 772-778.

Thomas, Shane, International Search Report and Written Opinion, PCT/US2023/018745, International Searching Authority, United States Patent and Trademark Office, Jul. 21, 2023.

Banzhaf et al., "Phase-Coded FMCW Lidar", 2021 29th European Signal Processing Conference (EUSIPCO), EURASIP, Aug. 23, 2021, XX034038479, pp. 1775-1779, retrieved on Nov. 15, 2021.

Kaleve, Abraham, Extended European Search Report, European Patent Office, Application No. 23792368.5, Dec. 22, 2025.

* cited by examiner

Cycle index (j)

Cycle index (j)

DATA REFINEMENT IN OPTICAL IMAGING SYSTEMS

FIELD

The invention relates to imaging systems. In particular, the invention relates to data refinement in imaging systems.

BACKGROUND

LIDAR systems output a system output signal that is reflected by objects located outside of the LIDAR system. The reflected light returns to the LIDAR system as a system return signal. The LIDAR system includes electronics that use the system return signal to estimate LIDAR data (radial velocity and/or distance between the LIDAR system and the objects) for a sample region that is illuminated by the system output signal. In some instances, the LIDAR data includes an estimate of the power of the system return signal.

An important measure of the performance of a LIDAR system is the precision of the LIDAR data measurements. However, the standard deviation of these estimates is influenced by a number of factors such as noise, speckle, interference and system practical limitations. These influences can be a source of random variations in the LIDAR data estimates and can reduce their precision.

As a result, there is a need for increased levels of precision in the LIDAR data generated by LIDAR systems.

SUMMARY

An imaging system is configured to output a system output signal during multiple associated data periods. A pattern of a frequency of the system output signal as a function of time is repeated during each of the associated data periods. The LIDAR system includes a light-combiner that combines light that returns to the LIDAR system from the system output signal with light from a reference signal so as to generate beating signals that are each beating at a beat frequency. Each of the beat frequencies is associated with a different one of the data periods. The system also includes electronics that calculate averaged frequencies that are each an average of multiple different beat frequencies and each of the averaged frequencies is associated with a different one of the data periods. The electronics calculate LIDAR data from the average frequencies. The LIDAR data indicates a radial velocity and/or distance between the system and an object outside of the system.

A method of operating an imaging system includes outputting from the imaging system a system output signal during multiple associated data periods. A frequency of the system output signal as a function of time being repeated during each of the associated data periods. The method also includes combining light that returns to the LIDAR system from the system output signal with light from a reference signal so as to generate beating signals that are each beating at a beat frequency. Each of the beat frequencies is associated with a different one of the data periods. The method further includes calculating averaged frequencies that are each an average of multiple different beat frequencies and each of the averaged frequencies are associated with a different one of the beat frequencies. Additionally, the method includes calculating LIDAR data from the averaged frequencies. The LIDAR data indicates a radial velocity and/or distance between the LIDAR system and an object outside of the LIDAR system.

In some instances, the number of beat frequencies that are averaged to calculate each of the averaged beat frequency is different for different averaged beat frequencies. Additionally or alternately, a value of an adjusted portion of the beat frequencies is adjusted to a value that is different from the value of the beat frequency of the beating signal. At least a portion of the beat frequencies that are averaged to calculate one or more of the averaged beat frequencies can have the adjusted value rather than the value of the beat frequency of the beating signal. The values of the adjusted portion of the beat frequencies can be adjusted in response to the beat frequencies in the adjusted portion being outliers. One or more outlier identification criteria can be applied to the beat frequencies so as to identify beat frequencies that are outliers.

The beat frequencies that are averaged so as to calculate a subject one of the averaged frequencies can be selected from beat frequency values that occur in an averaging window. The beat frequencies are selected such that a magnitude of a difference between each of the selected beat frequencies and a subject one of the beat frequencies is less than a threshold. Beat frequencies that are in the window but result in the magnitude of the difference being greater than the threshold can be excluded from the beat frequencies that are averaged so as to calculate the subject averaged frequencies. The subject beat frequency can be beat frequency associated with the subject averaged frequency.

The beat frequencies that are averaged so as to calculate a subject one of the averaged frequencies are selected from multiple beat frequencies in an averaging window. A surface selection criteria can be applied to the beat frequencies in the averaging window so as to identify the beat frequencies that are each a result of the system output signal illuminating the same surface on an object.

BRIEF DESCRIPTION OF THE FIGURES

FIG. 6A illustrates two different objects located in the field of view of a LIDAR system.

DESCRIPTION

An imaging system is a Frequency-Modulated Continuous Wave system that calculates a series of beat frequency values. The system includes electronics that use a moving average of the beat frequencies to calculate averaged beat frequency values that are each associated with one of the beat frequency values. The electronics estimate the LIDAR data (radial velocity and/or distance between the system and an object outside of the system) from the averaged beat frequency values rather than from the beat frequency values. The use of the averaged beat frequency values reduces the standard deviation of the LIDAR data and accordingly increase the precision of the LIDAR data.

The presence of outliers in the beat frequency values introduces distortions into the averaged beat frequency values. The electronics can identify these outliers and adjust the beat frequency values so as to reduce or eliminate the effect of outliers on the averaged beat frequency values. The ability to correct for these outliers increases the probability of detection for the LIDAR system.

The edge of an object in the system's field of view can also introduce distortions into the averaged beat frequency values. However, the electronics can select the beat frequency values that are averaged into the averaged frequency values. The selection of beat frequency values is done so as reduce or eliminate the distortion. For instance, the beat frequency values that are averaged to calculate an averaged beat frequency values can be selected so that the averaged values result from the same surface of an object. By averaging the beat frequency values from the same surface, the distortions caused by the presence of the edge are removed from the averaged beat frequency values. As a result, the LIDAR system can have the increased precision provided by the averaging of the beat frequency values combined with reduced distortions from outliers and edges.

Figure 1A:
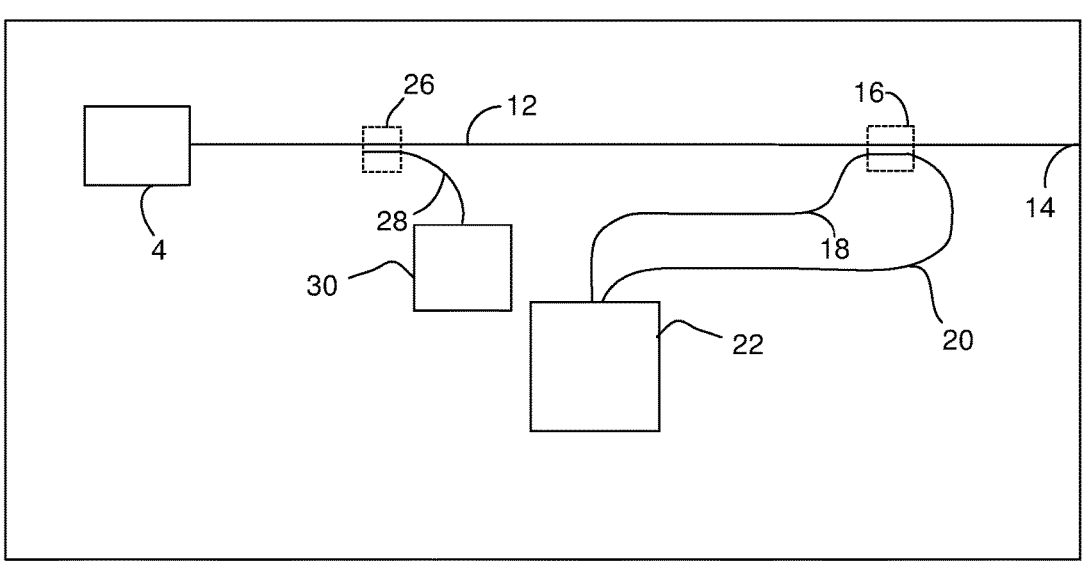
FIG. 1A is a topview of a schematic of a LIDAR system that includes or consists of a LIDAR chip that outputs a LIDAR output signal and receives a LIDAR input signal on a common waveguide.
Figure 1A:
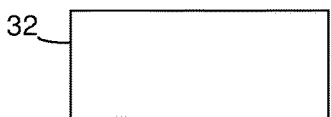

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a processing component 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the processing component 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the processing component 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MIMI) devices.

The control waveguide 28 carries the tapped signal to control components 30. The control components can be in electrical communication with electronics 32. All or a portion of the control components can be included in the electronics 32. During operation, the electronics can employ output from the control components 30 in a control loop configured to control a process variable of one, two, or three loop controlled light signals selected from the group consisting of the tapped signal, the system output signal, and the outgoing LIDAR signal. Examples of the suitable process variables include the frequency of the loop controlled light signal and/or the phase of the loop controlled light signal.

Figure 1B:
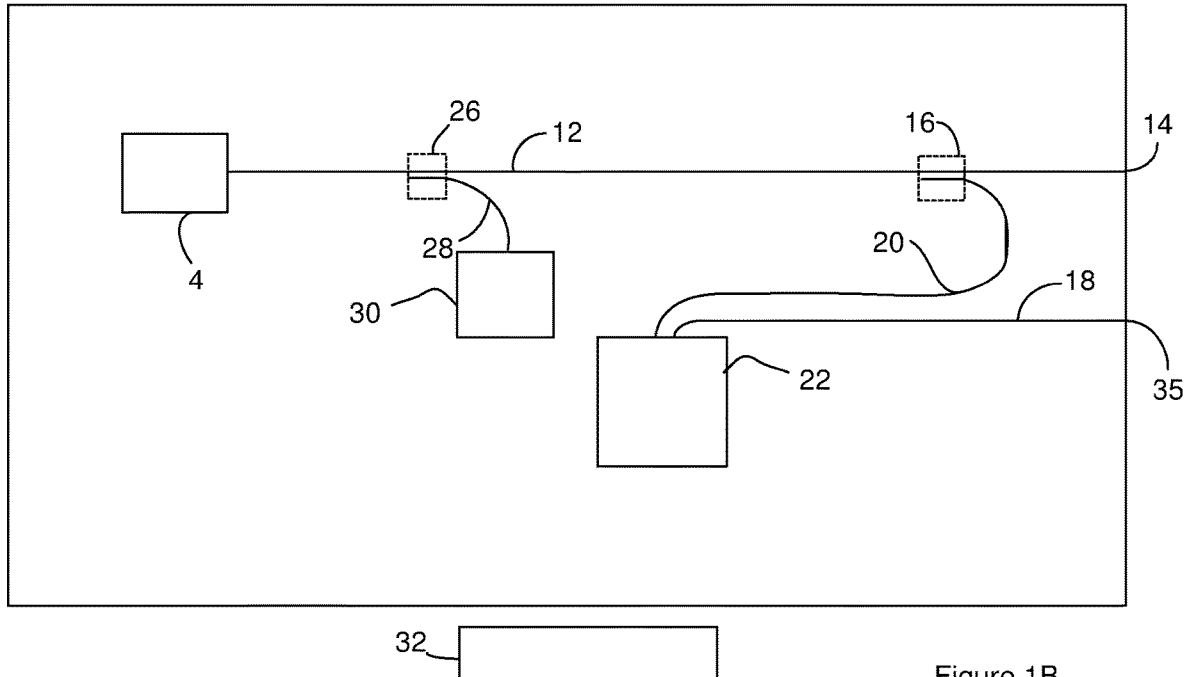
FIG. 1B is a topview of a schematic of a LIDAR system that includes or consists of a LIDAR chip that outputs a LIDAR output signal and receives a LIDAR input signal on different waveguides.
Figure 1B:

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a processing component 22 for further processing. As described in the context of FIG. 1A, the reference waveguide 20 carries the reference signal to the processing component 22 for further processing. As will be described in more detail below, the processing component 22 combines the comparative signal with the reference signal to form a composite signal that carries LIDAR data for a sample region on the field of view.

Figure 1C:
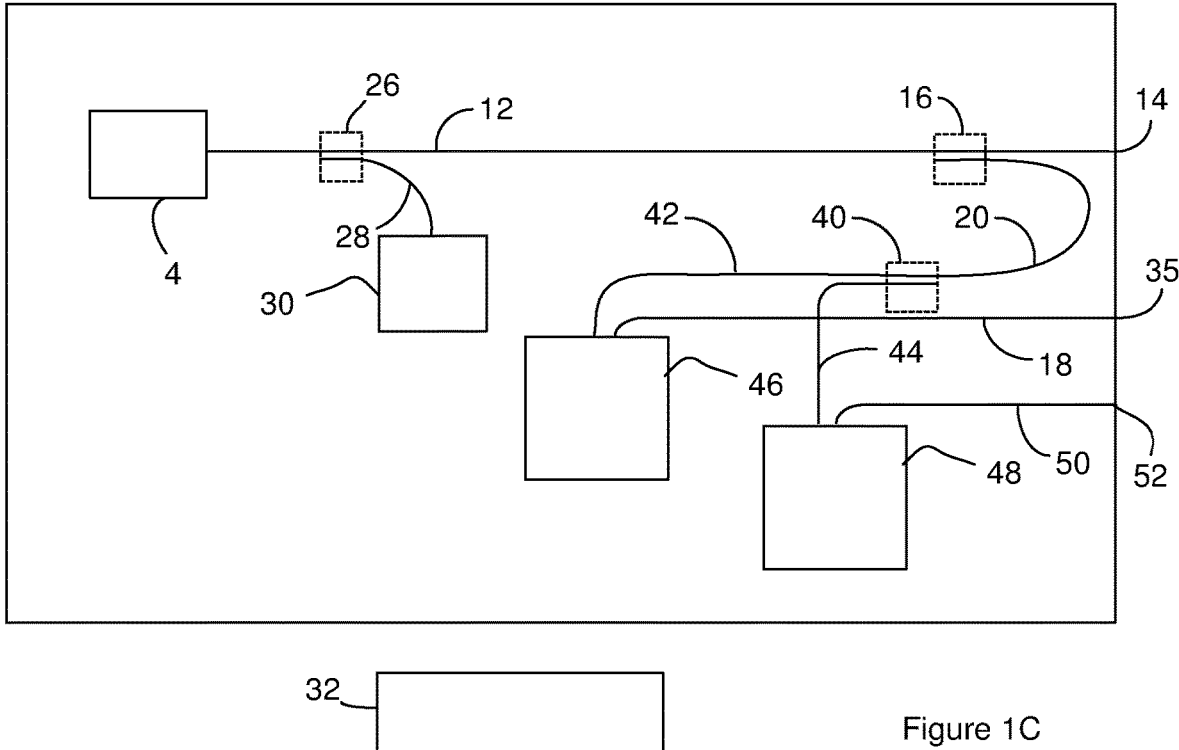
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first processing component 46 and the second reference waveguide 44 carries the second reference signal to a second processing component 48. Examples of suitable splitters 40 include, but are not limited to, y-junctions, optical couplers, and multimode interference couplers (MMIs).

The outgoing LIDAR signal exits the LIDAR chip through the facet 14 and serves as the LIDAR output signal. When light from the LIDAR output signal is reflected by one or more object located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first processing component 46 for further processing.

Additionally, when light from the LIDAR output signal is reflected by one or more object located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second processing component 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figures 2, 3:
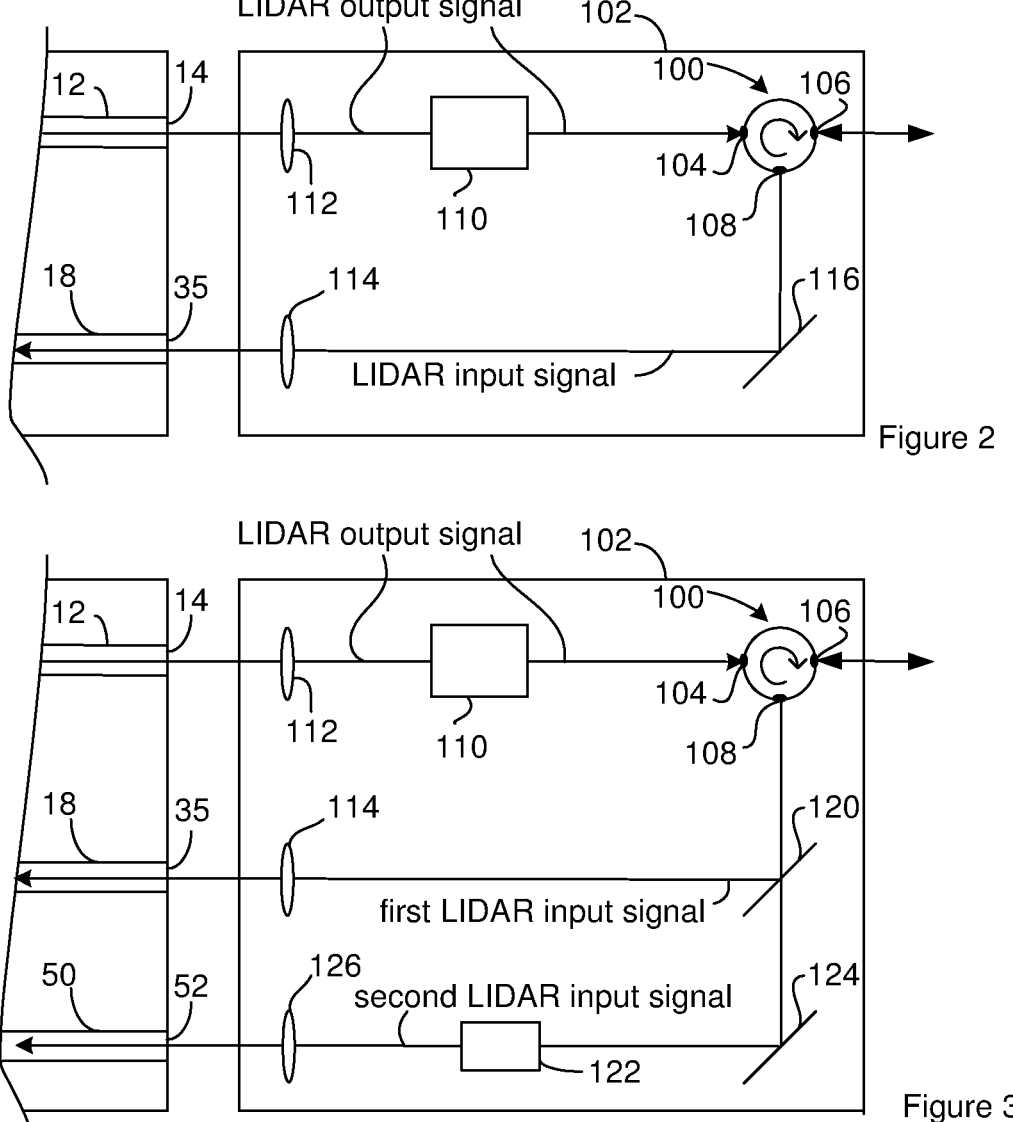
FIG. 2 is a topview of an example of a LIDAR adapter that is suitable for use with the LIDAR chip of FIG. 1B.
FIG. 3 is a topview of an example of a LIDAR adapter that is suitable for use with the LIDAR chip of FIG. 1C.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first processing component 46 and second composite signals generated by the second processing component 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
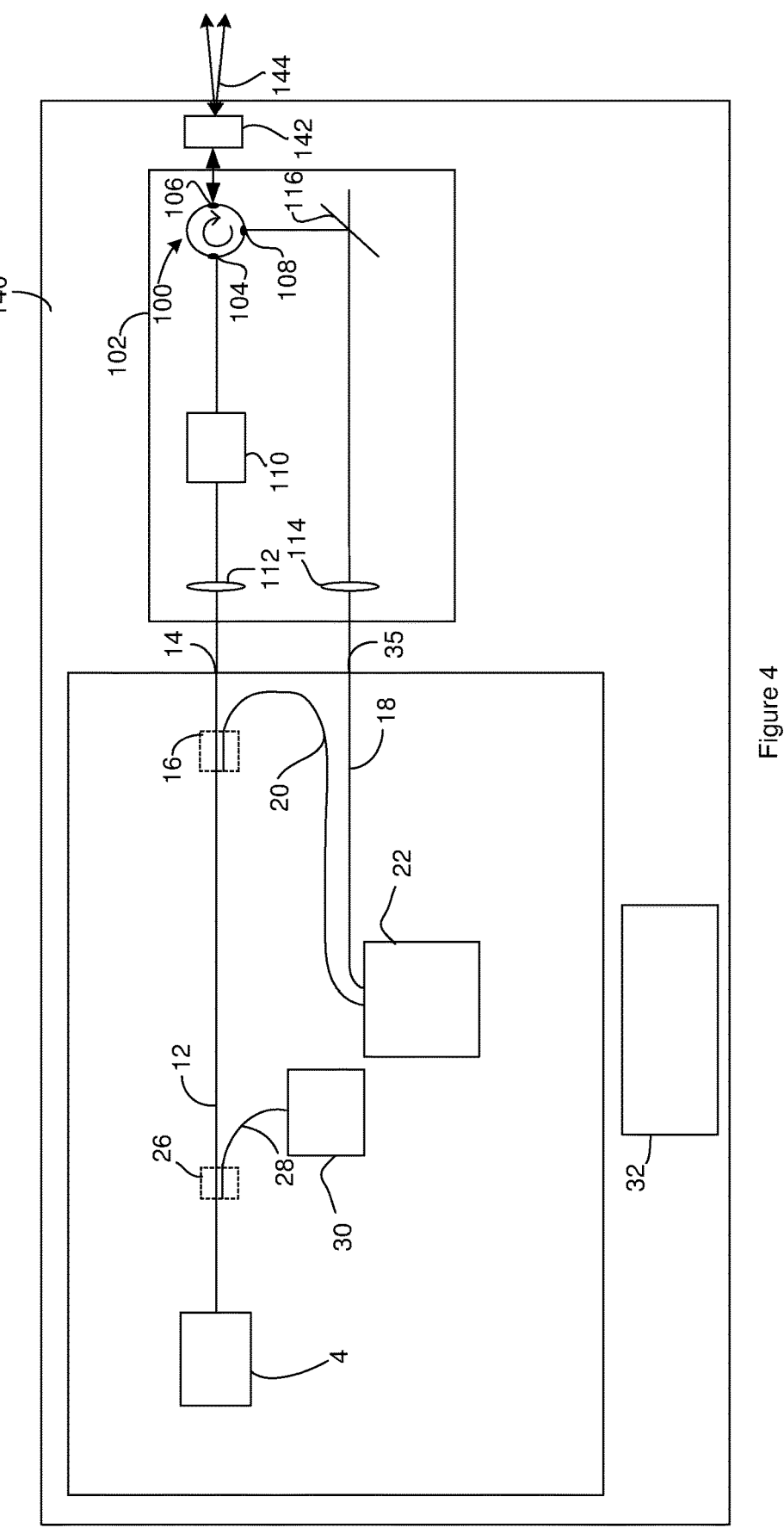
FIG. 4 is a topview of an example of a LIDAR system that includes the LIDAR chip of FIG. 1A and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1A and the LIDAR adapter of FIG. 2 on a common support 140.

Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 4 illustrates a beam steering component 142 that receive a LIDAR output signal from the LIDAR adapter. Although FIG. 4 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Figure 5A:
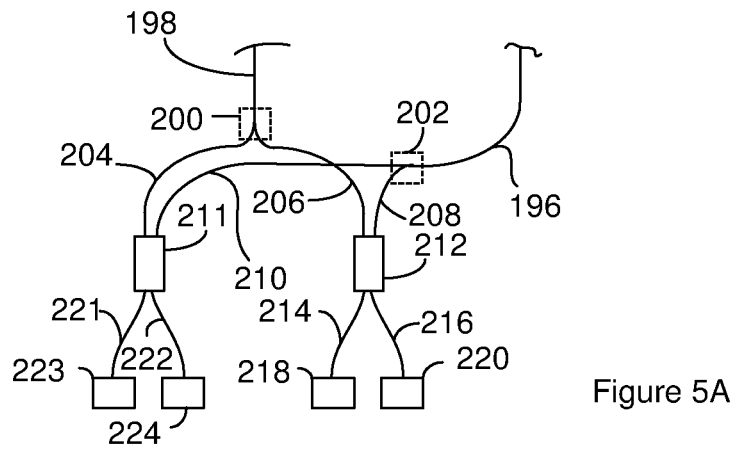
FIG. 5A illustrates an example of a processing component suitable for use with the LIDAR systems.
Figure 5B:
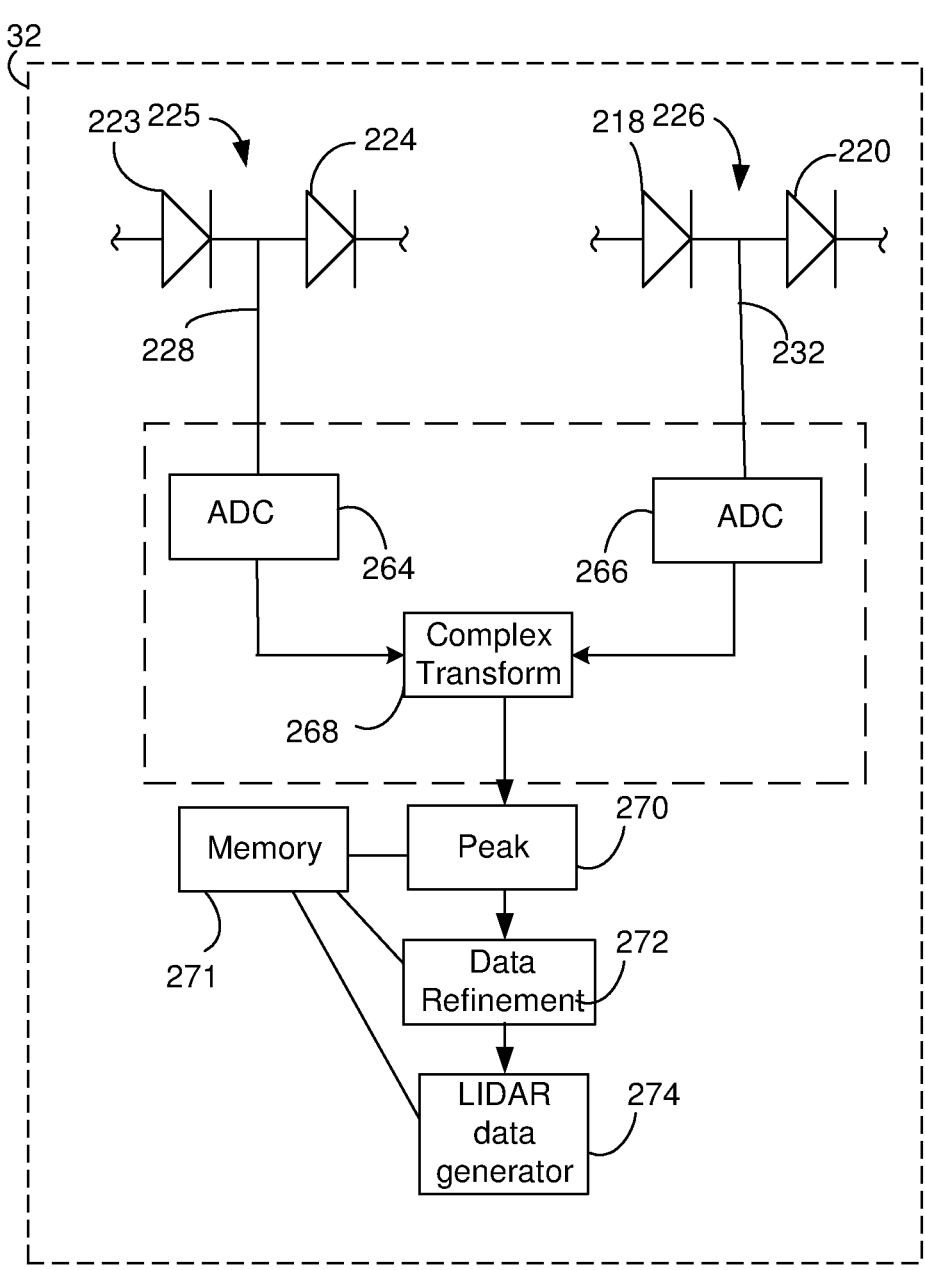
FIG. 5B provides a schematic of electronics that are suitable for use with a processing component constructed according to FIG. 5A.
Figure 5C:
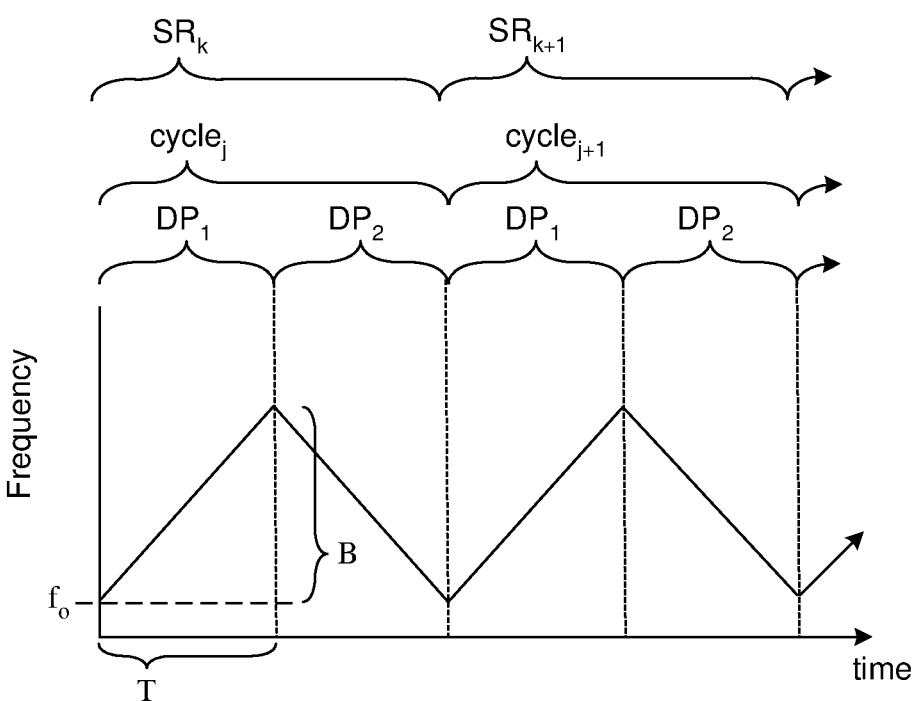
FIG. 5C is a graph of frequency versus time for a system output signal.

FIG. 5A through FIG. 5C illustrate an example of a suitable processing component for use as all or a fraction of the processing components selected from the group consisting of the processing component 22, the first processing component 46 and the second processing component 48. The processing component receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The processing component includes a second splitter 200 that divides the comparative signal carried on the comparative waveguide 196 onto a first comparative waveguide 204 and a second comparative waveguide 206. The first comparative waveguide 204 carries a first portion of the comparative signal to the light-combining component 211. The second comparative waveguide 208 carries a second portion of the comparative signal to the second light-combining component 212.

The processing component includes a first splitter 202 that divides the reference signal carried on the reference waveguide 198 onto a first reference waveguide 204 and a second reference waveguide 206. The first reference waveguide 204 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 32 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

The electronics 32 includes a peak finder 270 that receives output from the transform component 268. The peak finder 270 in configured to find a peak in output of the transform component 268 in order to identify the beat frequency of the composite optical signal. The mathematical transform can be a complex transform such as a complex Fast Fourier Transform (FFT). A complex transform such as a complex Fast Fourier Transform (FFT) provides an unambiguous solution for the beat frequency of the composite optical signal. The peak finder 270 can store the beat frequencies in a memory 271 for later use by a data refinement component 272 and by a LIDAR data generator 274. As will be described in more detail below, the beat frequencies can each be stored as $f_{m,j}$ where m represents the period index and j represents the cycle index. The LIDAR data generator 274 uses the beat frequencies to generate the LIDAR data (distance and/or radial velocity between the reflecting object and the LIDAR chip or LIDAR system). Suitable memories 271 include, but are not limited to, buffers.

The peak finder 270 can also store an indicator of the power of the system return signal (power level indicator) in the memory 271. One power level indicator is the magnitude of the peak in the output of the transform component 268. Accordingly, the magnitude of the peak frequency can serve as power level indicator. Alternatively, the power of the system return signal can be calculated from the peak frequency and can serve as the power level indicator. The power level indicator can be represented by $P_{m,j}$ where m represents the period index and j represents the cycle index. Accordingly, each of the power level indicators can be associated with a data period, a beat frequency ($f_{m,j}$) and/or an averaged beat frequency ($af_{m,j}$). The power level indicators can be stored in the memory 271 for access by the data refinement component 272 and/or the LIDAR data generator 274.

Although FIG. 5A illustrates light-combining components that combine a portion of the reference signal with a portion of the comparative signal, the processing component can include a single light-combining component that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

The electronics tune the frequency of the system output signal over time. The system output signal has a frequency versus time pattern with a repeated cycle. FIG. 5C shows an example of a suitable frequency versus time pattern for the system output signal. The base frequency of the system output signal ($f_o$) can be the frequency of the system output signal at the start of a cycle.

FIG. 5C shows frequency versus time for a sequence of two cycles labeled $cycle_j$ and $cycle_{j+1}$ where j represents a cycle index. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes M data periods that are each associated with a period index m and are labeled $DP_m$. In the example of FIG. 5C, each cycle includes three data periods labeled $DP_m$ with m=1 and 2. The frequency versus time pattern is repeated for data periods that correspond to each other (associated data periods) in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_m$, the electronics operate the light source such that the frequency of the system output signal changes at a linear rate $\alpha_m$ (the chirp rate). In FIG. 5C, $\alpha_2=-\alpha_1$.

FIG. 5C labels sample regions that are each associated with a sample region index k and are labeled $SR_k$. FIG. 5C labels sample regions $SR_{k-1}$ through $SR_{k+1}$. Each sample region is illuminated with the system output signal during the data periods that FIG. 5C shows as associated with the sample region. For instance, sample region $SR_{k+1}$ is illuminated with the system output signal during the data period labeled $DP_2$ within cycle j+1 and the data period labeled $DP_1$ within cycle j+1. Accordingly, the sample region labeled $SR_{k+1}$ is associated with the data periods labeled $DP_1$ and $DP_2$ within cycle j+1. The sample region indices k can be assigned relative to time. For instance, the samples regions can be illuminated by the system output signal in the sequence indicated by the index k. As a result, the sample region $SR_{10}$ can be illuminated after sample region $SR_9$ and before $SR_{11}$.

The frequency output from the Complex Fourier transform represents the beat frequency of the composite signals that each includes a comparative signal beating against a reference signal. The beat frequencies from two or more different data periods that are associated with the same sample region can be combined to generate the LIDAR data. For instance, the beat frequency determined from $DP_1$ during the illumination of sample region $SR_k$ can be combined with the beat frequency determined from $DP_2$ during the illumination of sample region $SR_k$ to determine the LIDAR data for sample region $SR_k$. As an example, the following equation applies during a data period where electronics increase the frequency of the outgoing LIDAR signal during the data period such as occurs in data period $DP_1$ of FIG. 5C: $f_{ub}=-f_d+\alpha_u\tau$ where $f_{ub}$ is the averaged frequency value $af_{1,j}$ described below, $\tau$ is the roundtrip delay (time between the system output signal exiting from the LIDAR system and the system return signal returning to the LIDAR system), $f_d$ represents the Doppler shift ($f_d=2V_kf_c/c$) where $f_c$ represents the optical frequency ($f_o$), c represents the speed of light, $V_k$ is the radial velocity between the reflecting object and the LIDAR system where the direction from the reflecting object toward the chip is assumed to be the positive direction, c is the speed of light, and $\alpha_u$ represents a chirp rate ($\alpha_m$) for the data period where the frequency of the system output signal increases with time ($\alpha_1$ in this case). The following equation applies during a data period where electronics decrease the frequency of the outgoing LIDAR signal such as occurs in data period $DP_2$ of FIG. 5C: $f_{db}=-f_d-\alpha_d\tau$ where $f_{db}$ where $f_{db}$ is the averaged frequency value $af_{2,j}$ described below, and $\alpha_d$ represents the chirp rate ($\alpha_m$) for the data period where the frequency of the system output signal increases with time ($\alpha_2$ in this case). In these two equations, $f_d$ and $\tau$ are unknowns. These equations can be solved for the two unknowns and the electronics can then determine the radial velocity for sample region k ($V_k$) from the Doppler shift ($V_k=c*f_d/(2f_c)$) and/or the separation distance for sample region k ($R_k$) can be determined from $c*\tau/2$. Accordingly, the averaged frequency values are variables in the calculation of the LIDAR data. The radial velocity and/or separation distance determined for a sample region can represent LIDAR data for the sample region.

Figure 5D:
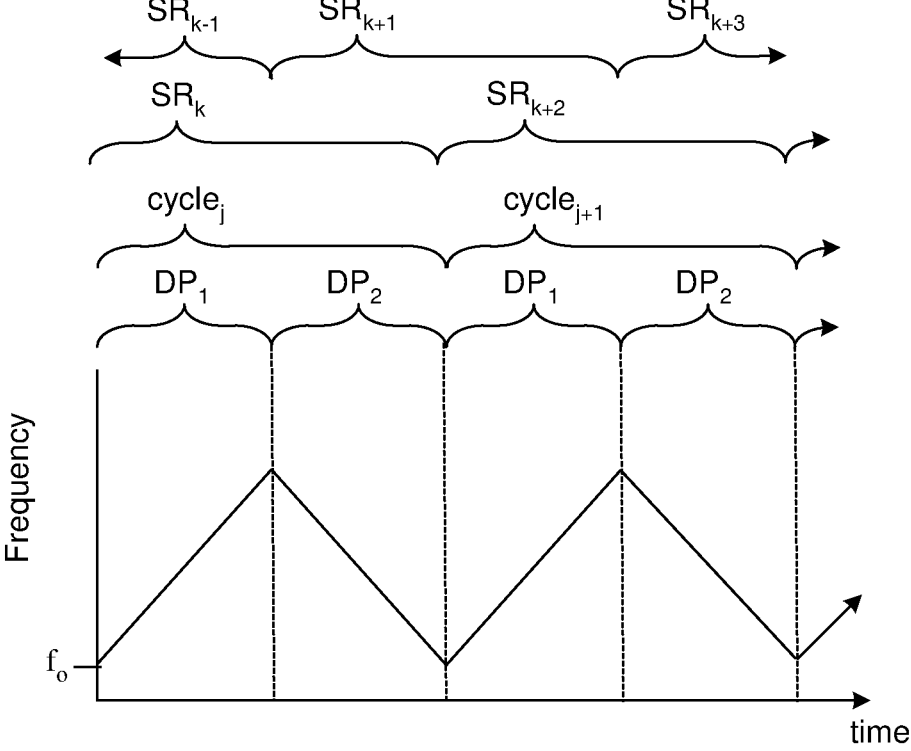
FIG. 5D is another embodiment of a graph of frequency versus time for a system output signal.

FIG. 5D illustrates another scheme for generating the LIDAR data. For instance, FIG. 5D illustrates the frequency versus time pattern of FIG. 5C but is modified so the sample regions are labeled $SR_{k-1}$ through $SR_{k+3}$. Each sample region is illuminated with the system output signal during the data periods that FIG. 5C shows as associated with the sample region. For instance, sample region $SR_{k+1}$ is illuminated with the system output signal during the data period labeled $DP_2$ within cycle j and the data period labeled $DP_1$ within cycle j+1. Accordingly, the sample region labeled $SR_{k+1}$ is associated with the data period labeled $DP_2$ within cycle j and the data period labeled $DP_1$ within cycle j+1.

As is evident from FIG. 5D, a data period is associated with multiple sample regions. For instance, the data period labeled $DP_2$ within cycle j is associated with the sample region labeled $SR_{k+1}$ and the sample region labeled $SR_k$. Accordingly, different groups of data periods can share a common data period. However, groups that share a common data period can each include one or more data periods that are not shared by the group. Since a sample region is illuminated by the system output signal during an associated data period and different sample regions can be associated with the same data period, different sample regions can overlap one another.

The system output signal can be chirped during at least a portion of the data periods in the same cycle. The chirp can be constant and continue for the duration of the data period (T). For instance, during the data periods labeled $DP_1$, and the data periods labeled $DP_2$, the electronics operate the light source such that the frequency of the system output signal changes at a linear rate $\alpha$ (B/T). The direction of the frequency change during the data period $DP_1$ is the opposite of the direction of the frequency change during the data period $DP_2$. Accordingly, the chirp of the system output signal can be different for different data periods within the same cycle.

The frequency output from the Complex Fourier transform represents the beat frequency of the composite signals that each includes a comparative signal beating against a reference signal. The LIDAR data for a sample region can be generated from the beat frequencies ($f_{LDP}$) from the group of data periods associated with the sample region. Accordingly, the electronics generate a set of LIDAR data for a sample region from light that is included in the system output signal during a group of multiple data periods. For instance, the beat frequency determined from $DP_1$ in cycle j can be combined with the beat frequency determined from $DP_2$ in cycle j to determine LIDAR data for the sample region labeled $SR_k$. Accordingly, the electronics generate a set of LIDAR data for the sample region $SR_k$ from a group data periods that includes the data periods labeled $DP_1$ and $DP_2$ in cycle j.

As an example of how LIDAR data for a sample region is determined from a group of data periods, the following equation applies during a data period where electronics increase the frequency of the outgoing LIDAR signal during the data period such as occurs in data period $DP_1$ (m=1) in cycle j of FIG. 5D: $f_{ub}=-f_d+\alpha\tau$ where $f_{ub}$ is the averaged frequency value $af_{1,j}$ described below, $\tau$ is the roundtrip delay (time between the system output signal exiting from the LIDAR system and the system return signal returning to the LIDAR system), $f_d$ represents the Doppler shift ($f_d=2vf_c/c$) where $f_c$ represents the optical frequency ($f_o$), c represents the speed of light, $v$ is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ (m=2) in cycle j of FIG. 5D: $f_{db}=-f_d-\alpha\tau$ where $f_{db}$ is the averaged frequency value $af_{2,j}$ described below. In these two equations, $f_d$ and $\tau$ are unknowns. The electronics solve these two equations for the two unknowns $f_d$ and $\tau$. The radial velocity for the sample region then be quantified from the Doppler shift ($v=c*f_d/(2f_c)$) and/or the separation distance for that sample region can be quantified from $c*\tau/2$. Accordingly, the averaged frequency values are variables in the calculation of the LIDAR data.

The above example discloses generation of LIDAR data for a sample region ($SR_k$) from a group of data periods that fall within the same cycle (cycle$_j$). However, the LIDAR data for a sample region can be generated for a group of data periods that include data periods from different cycles. For instance, the LIDAR data can be generated for the sample region labeled $SR_{k+1}$ using the associated data periods. For instance, the LIDAR data for the sample region labeled $SR_{k+1}$ can be generated as described above using the value of fa from the data period labeled $DP_2$ within cycle j and the value of $f_{ub}$ from the data period labeled $DP_1$ within cycle j+1.

Figure 5E:
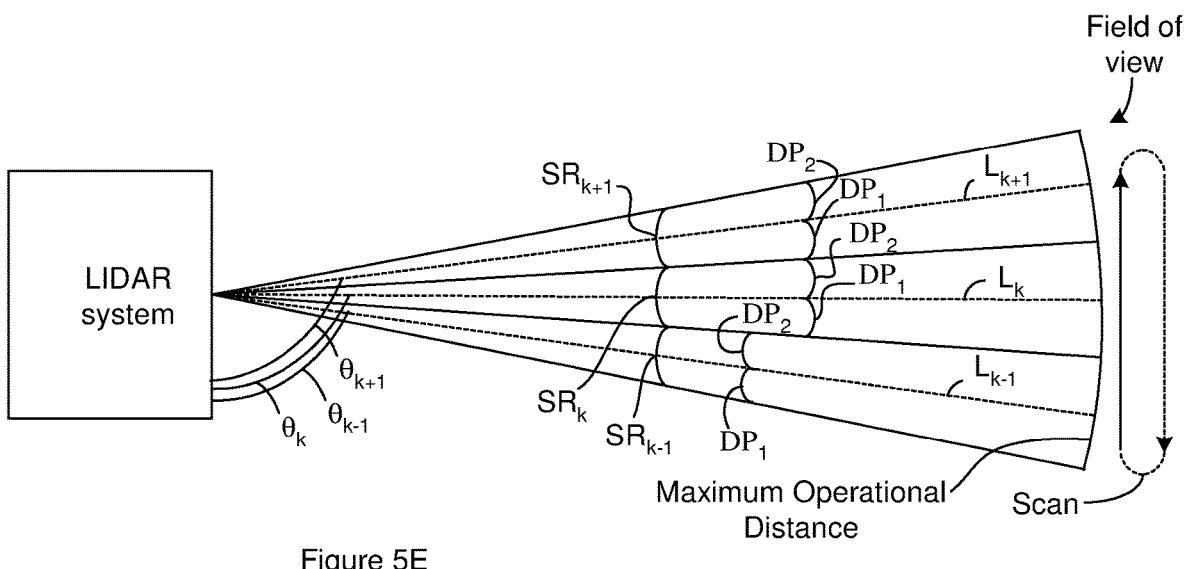
FIG. 5E illustrates a relationship between the data periods disclosed in FIG. 5C and the field of view for the LIDAR system.

FIG. 5E illustrates a relationship between the data periods disclosed in FIG. 5C and the field of view for the LIDAR system. The field of view is defined by a collection of sample regions labeled $SR_{k-1}$ through $SR_{k+1}$. The LIDAR system outputs a system output signal that is scanned in the direction of the solid line labeled "scan." The system output signal is scanned through a series of the sample regions ($SR_{k-1}$ through $SR_{k+1}$). The collection of sample regions that are scanned by the system output signal make up the field of view for the LIDAR system. Object(s) in the field of view can change with time. As a result, the locations of the sample regions are determined relative to the LIDAR system rather than relative to the environment and/or atmosphere in which the LIDAR system is positioned. For instance, the sample regions can be defined as being located within a range of angles relative to the LIDAR system. The dashed line labeled scan in FIG. 5D illustrates that the scan of the sample regions in the field of view can be repeated in multiple scan cycles. Accordingly, each scan cycle can scan the system output signal through the same sample regions when the objects in the field of view have moved and/or changed. The sample regions in the field of view can be scanned in the same sequence during different scan cycles or can be scanned in different sequences in different scan cycles.

The portion of each sample region that corresponds to one of the data periods are each labeled $DP_1$ or $DP_2$ in FIG. 5E. As is evident from FIG. 5C, the chirp rate during data period $DP_1$ is $\alpha_1$ and the chirp rate during the data period $DP_2$ is $\alpha_2$.

Each of the sample regions includes a dashed line labeled $L_k$. The dashed line labeled $L_k$ can serve as a location reference line for sample region k. FIG. 5E includes location reference lines labeled $L_{k-1}$ through $L_{k+1}$. In FIG. 5E, each of the location reference lines ($L_k$) is drawn along the longitudinal axis of sample region with sample region index k.

FIG. 5E illustrate multiple orientation angles labeled $\theta_k$ where k represents the sample region index k. The orientation angle $\theta_k$ can measure the angular orientation of sample region $SR_k$ relative to the LIDAR system. In some instances, the orientation angles $\theta_k$ are measured relative to the location reference lines $L_k$ as shown in FIG. 5E. As a result, the orientation angles $\theta_k$ can measure the angular orientation of the location reference lines $L_k$. Because FIG. 5E illustrates the LIDAR system having a two-dimensional field of view, a single angle ($\theta_k$) can define the angular orientation of sample region $SR_k$ relative to the LIDAR system; however, the field of view is often three dimensional. As a result, the LIDAR system can use two or more angles and/or other variables to define the orientation of a sample region relative to the LIDAR system.

Figure 5F:
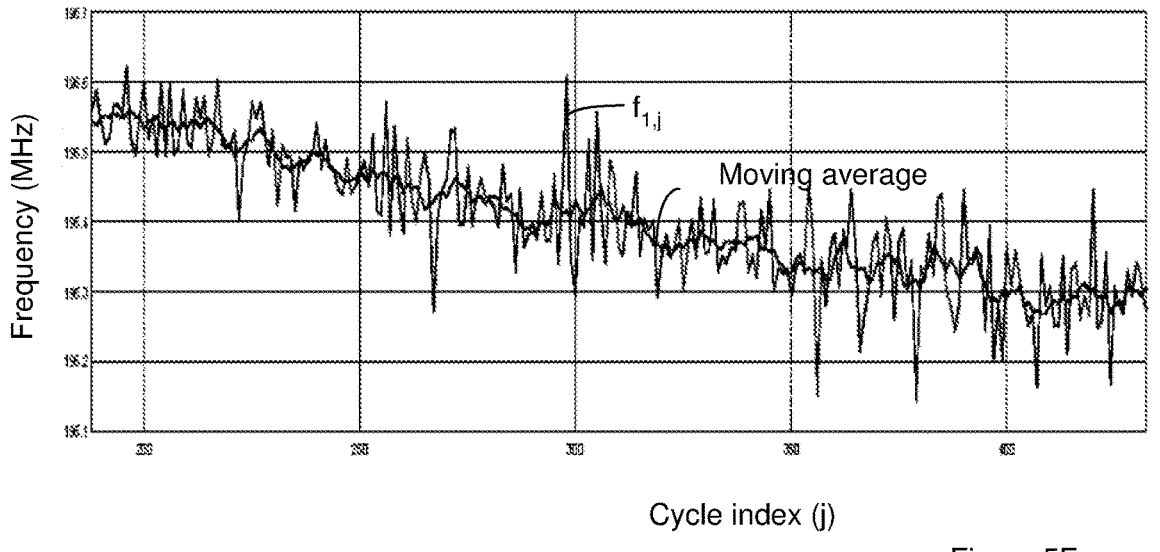
FIG. 5F is a graph of frequency versus the cycle index (j).

The data refinement component 272 is configured to perform a moving average of beat frequencies ($f_{m,j}$) having the same period index (m). For instance, FIG. 5F is a graph of frequency versus the cycle index (j). The curve labeled "$f_{1,j}$" represents the beat frequencies for data period m=1

($f_{1,j}$) as a function of the cycle index (j). The curve labeled "moving average" represents a moving average of the beat frequencies ($f_{m,j}$) average over as many as Q points. Although FIG. 5F is illustrated for data period m=1, a similar "moving average" curve can be generated for the data periods m=2.

Each of the points in the moving average curve can be represented by an averaged frequency ($af_{m,j}$) where m represents the period index and j represents the cycle index. The value of averaged frequency ($af_{m,j}$) can be calculated by averaging an equal number of frequency values on either side of the center beat frequency value ($f_{m,j}$). For instance, when the moving average is taken over Q points, the value of averaged frequency $af_{1,j}$ can be calculated by averaging the beat frequency values from $f_{1,j-(Q-1)/2}$ to $f_{1,j+(Q-1)/2}$ where Q is an odd integer. The "moving average" curve in FIG. 5F was averaged over Q=7 points. Suitable values for Q can be dependent on the application of the LIDAR system. Examples of suitable values for Q include, but are not limited to, values greater than or equal to 3 and less than or equal to 19. As is evident from FIG. 5F, the averaged frequency values ($af_{1,j}$) have a lower standard deviation than the beat frequency values ($f_{m,j}$) and accordingly have higher precision.

FIG. 6A illustrates two different objects located in the field of view of a LIDAR system. The LIDAR system outputs a system output signal that is scanned in the direction of the solid line labeled "scan." The system output signal is scanned through a series of sample regions labeled $SR_{k-1}$ through $SR_{k+1}$. The sample regions are labeled according to the scheme of FIG. 5C and accordingly does not include overlapping sample region as occurs in the scheme of FIG. 5D. During the scan of the sample regions labeled $SR_k$ the system output signal switches from being incident on one surface to being incident on another surface.

Figure 6B:
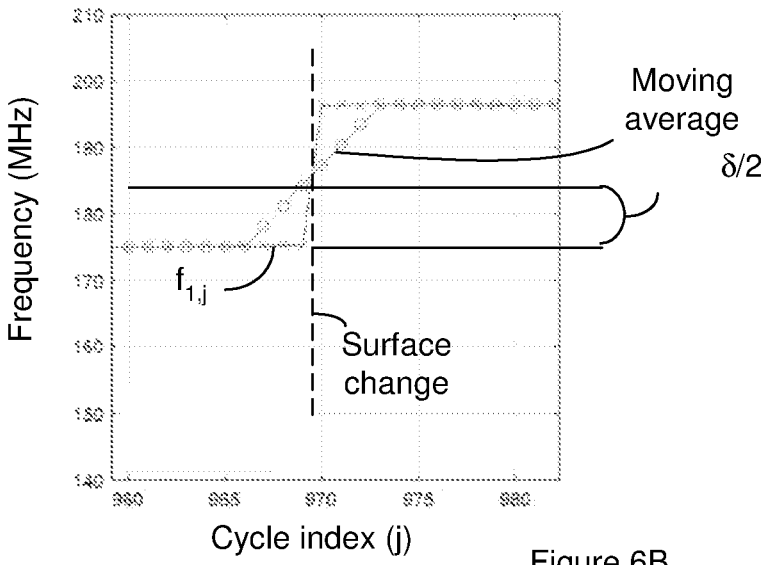
FIG. 6B compares the results for beat frequency versus time and averaged beat frequency versus time when a system output signal changes surfaces.

The presence of the edge between different surfaces is a possible source of distortion in the averaged frequency values ($af_{m,j}$). As an example, FIG. 6B is a graph of frequency versus the cycle index (j). The curve labeled "$f_{1,j}$" represents the beat frequencies for data period m=1 ($f_{1,j}$) as a function of the cycle index (j). The curve labeled "moving average" represents a moving average of the beat frequencies ($f_{m,j}$) averaged over Q points. The line labeled "surface change" indicates the time where the system output signal switches from being incident on one surface to being incident on another surface.

As is evident from the comparison of the beat frequency curve labeled "$f_{1,j}$" to the "moving average" curve, the switch from one surface to another surface causes the averaged frequency values ($af_{m,j}$) to become distorted and inaccurate. A similar distortion occurs when a system output signal switches from being incident on a surface to a location where a reflecting surface is not present or switched from a location where a reflecting surface is not present to being incident on a surface.

Another source of distortions in the averaged frequency values ($af_{m,j}$) is the presence of outliers in the beat frequencies values ($f_{m,j}$). Outliers are beat frequencies values ($f_{m,j}$) that provide results that are not consistent with the surrounding beat frequencies values ($f_{m,j}$). Outliers do not necessarily occur at a transition between surfaces but can occur in the middle of a surface. As a result, an outlier can be a beat frequencies value ($f_{m,j}$) resulting from a system output signal being incident on a surface but being inconsistent with other beat frequencies values ($f_{m,j}$) from that same surface.

Figure 6C:
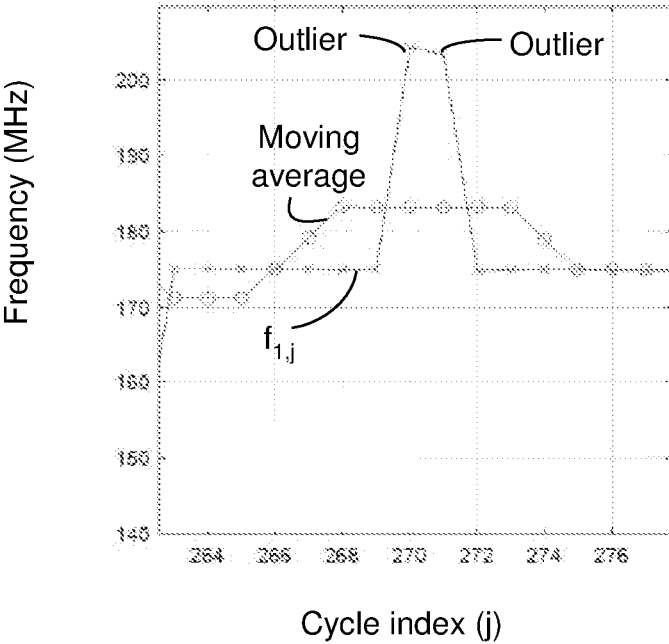
FIG. 6C compares the results for beat frequency versus time and averaged beat frequency versus time when an outlier is present.

FIG. 6C illustrates the effect of an outlier on the averaged frequency values ($af_{m,j}$). As is evident from the comparison of the beat frequency curve labeled "$f_{1,j}$" to the "moving average" curve, the presence of the outliers pulled the averaged frequency values ($af_{m,j}$) away from the accurate values and caused the averaged frequency values ($af_{m,j}$) to become distorted and inaccurate.

Figure 7:
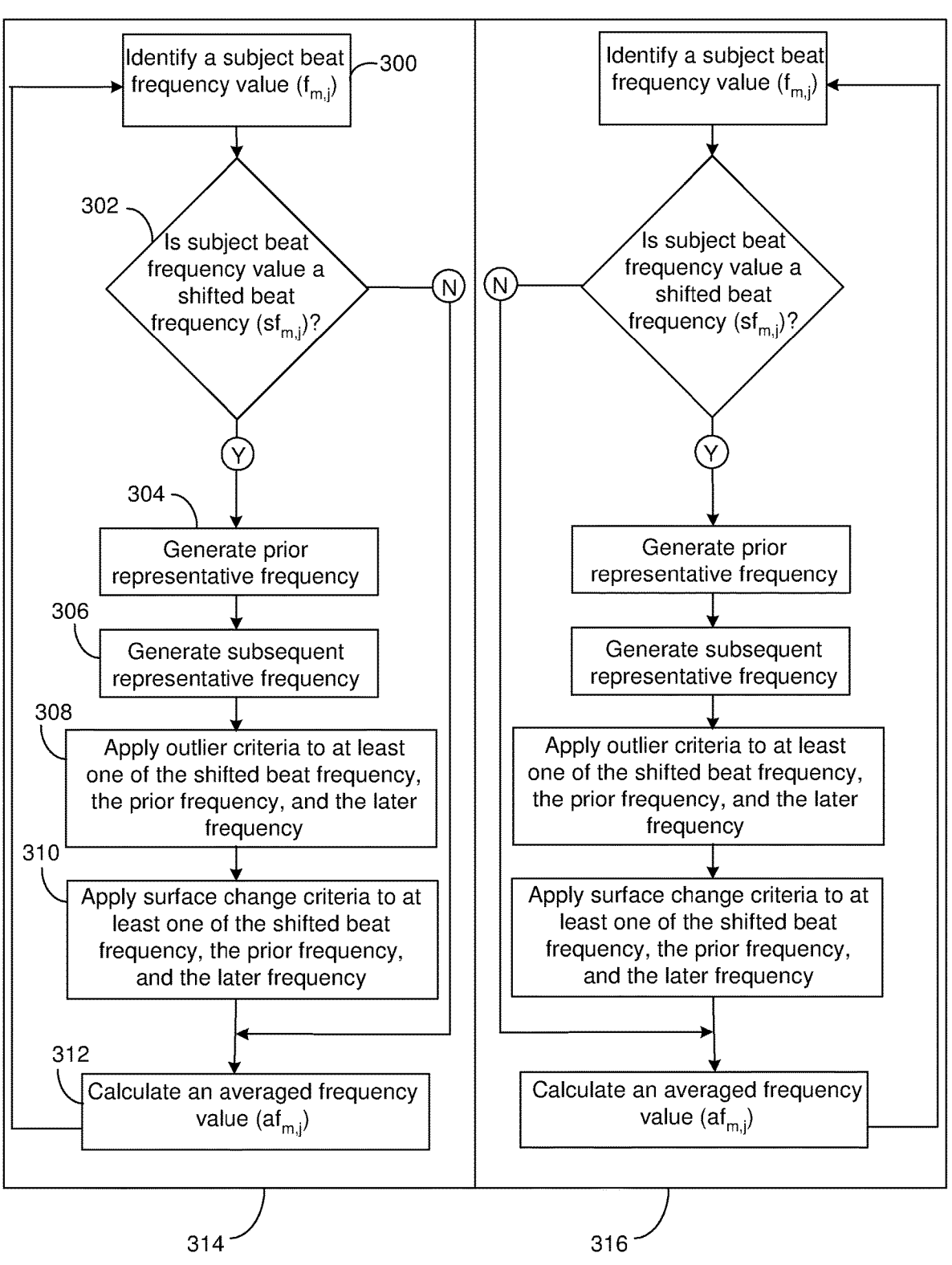
FIG. 7 illustrates a process flow for refining data to address the presence of frequency outliers and/or surface changes in the beat frequency values ($f_{m,j}$).

The data refinement component 272 can be configured to address the presence of frequency outliers and/or surface changes in the frequency values ($f_{m,j}$) before, or as part of, averaging the frequency values ($f_{m,j}$) so as to calculate the averaged frequency values ($af_{m,j}$). FIG. 7 illustrates a process for addressing the presence of frequency outliers and/or surface changes in the beat frequency values ($f_{m,j}$).

At process block 300, the data refinement component 272 identifies one of the beat frequency values ($f_{m,j}$) as a subject beat frequency that can be represented by $f_{m,j'}$ where j' represents the cycle index of the subject beat frequency.

The data refinement component 272 proceeds from process block 300 to determination block 302 where the data refinement component 272 determines whether the subject beat frequency ($f_{m,j'}$) is a shifted beat frequency. A shifted beat frequency value ($f_{m,j'}$) has a beat frequency that is shifted by some amount relative to another beat frequency value that serves as a reference beat frequency value. For instance, a shifted beat frequency value can have a value that is different from another one of the beat frequency values by $\delta/2$ where $\delta$ is a constant. In some instances, the reference beat frequency values is the beat frequency value that precedes the shifted beat frequency value and has the same period index (m). As an example, beat frequency values ($f_{m,j}$) where $|f_{m,j}-f_{m,j-1}|>\delta/2$ can be shifted beat frequency values while beat frequency values ($f_{m,j}$) where $|f_{m,j}-f_{m,j-1}|\leq\delta/2$ can be unshifted beat frequency values.

The value of $\delta/2$ can be selected to be greater than the level of noise that generally occurs in the beat frequency. Additionally, the value of $\delta/2$ can be selected such that a change in the beat frequency from one beat frequency value to the next by an amount greater than $\delta/2$ is caused either by an outlier or a change in the surface upon which the system output signal is incident. Suitable values for 6 include, but are not limited to, values greater than 0.01 MHz and/or less than or equal to 100 MHz. In one example, $\delta$ is greater than or equal to 0.5 MHz and less than or equal to 2 MHz.

When the subject beat frequency ($f_{m,j'}$) is found to be a shifted beat frequency, the data refinement component 272 can proceed from determination block 302 to process block 304 where the data refinement component 272 can calculate a prior representative frequency. The prior representative frequency can be a frequency value calculated so as to be representative of the beat frequency values that have the same data period index m as the subject beat frequency value ($f_{m,j'}$) and that occur within a time window before the subject beat frequency ($f_{m,j'}$). An example prior representative frequency is an average of a first selection of beat frequency values ($f_{m,j}$) that each occurs in the time window before the identified subject beat frequency ($f_{m,j'}$). In some instances, the data refinement component 272 applies a standard deviation reduction algorithm to candidate beat frequency values ($cf_{m,j}$) so as to identify beat frequency values ($f_{m,j}$) that are included in the first selection of beat frequency values ($f_{m,j}$). The standard deviation reduction algorithm can be selected to reduce the standard deviation of the beat frequency values ($f_{m,j}$) that are included in the first selection of beat frequency values ($f_{m,j}$) relative to the standard deviation of the beat frequency values ($f_{m,j}$) in the candidate beat frequency values ($cf_{m,j}$).

The data refinement component 272 can proceed from process block 304 to process block 306 where the data refinement component 272 can calculate a subsequent representative frequency. The subsequent representative frequency can be a frequency value calculated so as to be representative of the beat frequency values that have the same data period index m as the subject beat frequency ($f_{m,j'}$) and that occur within a time window after the subject beat frequency ($f_{m,j'}$). An example subsequent representative frequency is an average of a second selection of beat frequency values ($f_{m,j}$) that each occurs in the time window after the subject beat frequency ($f_{m,j'}$). In some instances, the data refinement component 272 applies a standard deviation reduction algorithm to candidate beat frequency values ($cf_{m,j}$) so as to identify beat frequency values ($f_{m,j}$) that are included in the second selection of beat frequency values ($f_{m,j}$). The standard deviation reduction algorithm can be selected to reduce the standard deviation of the beat frequency values ($f_{m,j}$) that are included in the first selection of beat frequency values ($f_{m,j}$) relative to the standard deviation of the beat frequency values ($f_{m,j}$) in the candidate beat frequency values ($cf_{m,j}$).

The data refinement component 272 can proceed from process block 306 to process block 308 where the data refinement component 272 can apply one or more outlier detection criteria to one or more components selected from the group consisting of the subject beat frequency ($f_{m,j'}$), the prior representative frequency, the subsequent representative frequency, and combinations thereof. The one or more outlier detection criteria is selected to indicate whether the subject beat frequency ($f_{m,j'}$) is an outlier. When the one or more outlier detection criteria indicate that the subject beat frequency ($f_{m,j'}$) is an outlier, the data refinement component 272 can adjust the value of the subject beat frequency ($f_{m,j'}$) so as to adjust for the presence of the outlier.

The data refinement component 272 can proceed from process block 308 to process block 310 where the data refinement component 272 can optionally apply one or more surface change criteria to one or more components selected from the group consisting of the shifted beat frequency value, the prior representative frequency, the subsequent representative frequency, and combinations thereof. The one or more outlier detection criteria is selected to indicate whether the shift associated with the shifted beat frequency value ($f_{m,j'}$) is a result of the system output signal moving onto or off of a surface.

The data refinement component 272 can proceed from process block 310 to process block 312. Additionally, when the subject beat frequency ($f_{m,j'}$) is found not to be a shifted beat frequency, the data refinement component 272 can proceed from determination block 302 to process block 312. At process block 312, the data refinement component 272 averages multiple different beat frequency value ($f_{m,j}$) so as to form an averaged frequency value ($af_{m,j'}$) with the same period index m and cycle index j as the subject beat frequency ($f_{m,j'}$). The average frequency values can be weighted or unweighted. For instance, the beat frequency values ($f_{m,j}$) closer in time to the subject beat frequency ($f_{m,j'}$) can be given more weight than beat frequency values ($f_{m,j}$) further in time from the subject beat frequency ($f_{m,j'}$). The data refinement component 272 can apply a surface selection criteria to the beat frequency values ($f_{m,j}$) so as to select particular beat frequencies values for use in the average. The surface selection criteria can be configured such that the beat frequencies values that result from the system output signal illuminating the same surface are selected for inclusion in the average.

The data refinement component 272 returns to process block 300 from process block 312. When the data refinement component 272 returns to process block 300, the data refinement component 272 can select another beat frequency value to serve as the subject beat frequency. For instance, the data refinement component 272 can select the beat frequency value that is next in time after the current subject beat frequency and has the same period index as the current subject beat frequency to serve as the next subject beat frequency. For instance, when the subject beat frequency is represented as $f_{2,j'}$, the data refinement component 272 can select the beat frequency represented by $f_{2,j'+1}$, as the next subject beat frequency.

The blocks 300 through 312 in FIG. 7 are included in a first algorithm labeled 314. The method can also include a second algorithm labeled 316 that includes the same blocks. The first algorithm 314 and the second algorithm 316 can be performed on beat frequency values from different data periods. For instance, the first algorithm 314 can be performed on beat frequency values for the data periods with period index m=1 ($f_{1,j}$) while the second algorithm 316 is performed on beat frequency values for the data periods with period index m=2 ($f_{2,j}$). As a result, the data refinement component 272 can generate averaged frequency value ($af_{m,j}$) for each of the different data periods (i.e. $af_{1,j}$ and $af_{2,j}$). Although FIG. 7 illustrates the data refinement component 272 performing the first algorithm 314 in parallel with the second algorithm 316, the first algorithm 314 and the second algorithm 316 can be performed in series.

Figure 8:
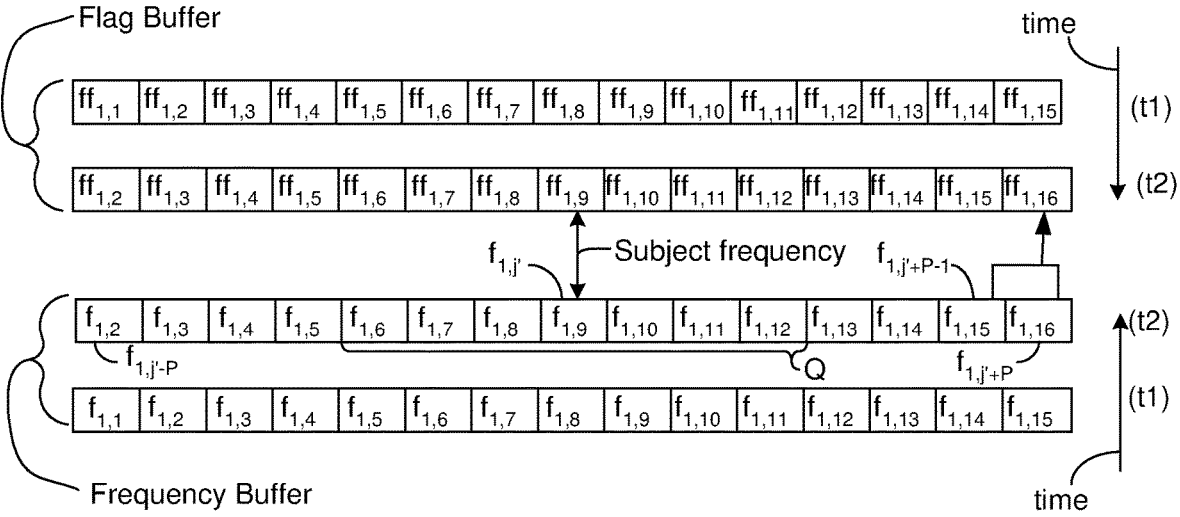
FIG. 8 illustrates an example of buffers suitable for use in executing the process of FIG. 7.

FIG. 8 illustrates an example of buffers suitable for use in executing the process of FIG. 7. One of the buffers is a flag buffer and one of the buffers is a frequency buffer. Each of the buffers includes 2P+1 buffer elements where P is an integer selected such that P≥Q where Q is the averaging depth. For the purposes of illustration, FIG. 7 uses P=7. Suitable values for P include, but are not limited to, values greater than 3 and/or less than 100. In one example, P is greater than 3 and less than 20.

Beat frequency values ($f_{m,j}$) having the same period index are stored in the frequency buffer. The stored beat frequency values ($f_{m,j}$) change with time as illustrated by the arrow labeled time. For instance, an example of the frequency buffer contents is labeled t2 and another example of the frequency buffer contents is labeled t1. The time t2 occurs after the time t1. A comparison of the frequency buffer contents shows that more recent beat frequency values ($f_{m,j}$) enter from the right while earlier beat frequency values ($f_{m,j}$) exit from the left.

Flags associated with each of the beat frequency values in frequency buffer are stored in the flag buffer. The labeled $ff_{m,j}$ is the flag for the beat frequency values $f_{m,j}$.

The beat frequency value ($f_{m,j}$) that occupies the center frequency buffer element can serve as the subject beat frequency. Accordingly, the beat frequency value in frequency buffer element number P+1 can be selected to serve as the subject beat frequency. In the frequency buffer example of FIG. 7 at the time labeled t2, the beat frequency values ($f_{1,9}$) would be selected to serve as the subject beat frequency. The subject beat frequency can be represented by $f_{m,j'}$ where j' represents the cycle index of the subject beat frequency. In the frequency buffer example of FIG. 7 at the time labeled t2, j'=9.

The data refinement component 272 can flag beat frequency values ($f_{m,j}$) that are shifted beat frequency values. Shifted beat frequency values ($f_{m,j}$) are beat frequency values that are candidates for being an outlier or at a surface change. In some instances, the data refinement component 272 identifies shifted beat frequency values by comparing the beat frequency values ($f_{m,j}$) in adjacent frequency buffer elements to a threshold and/or by comparing the change between beat frequency values ($f_{m,j}$) in adjacent frequency buffer elements to a threshold. As an example, the data refinement component 272 can compare the difference between the beat frequency values ($f_{m,j}$) in buffer elements 2P+1 and 2P to a threshold. In the frequency buffer example of FIG. 7 at the time labeled t2, the beat frequency value ($f_{1,16}$) occupies frequency buffer element number 2P+1 and the beat frequency value ($f_{1,15}$) occupies frequency buffer element number 2P. In one example, the beat frequency value $f_{m,j'+P}$ is flagged as a shifted frequency when $|f_{m,j'+P}-f_{m,j'+P-1}|\delta/2$ but is flagged as an unshifted shifted frequency when $|f_{m,j'+P}-f_{m,j'+P-1}|\leq\delta/2$. In this example, the beat frequency value $f_{m,j'+P-1}$ serves as a reference frequency against which beat frequency value $f_{m,j'+P}$ is compared.

Figure 9:
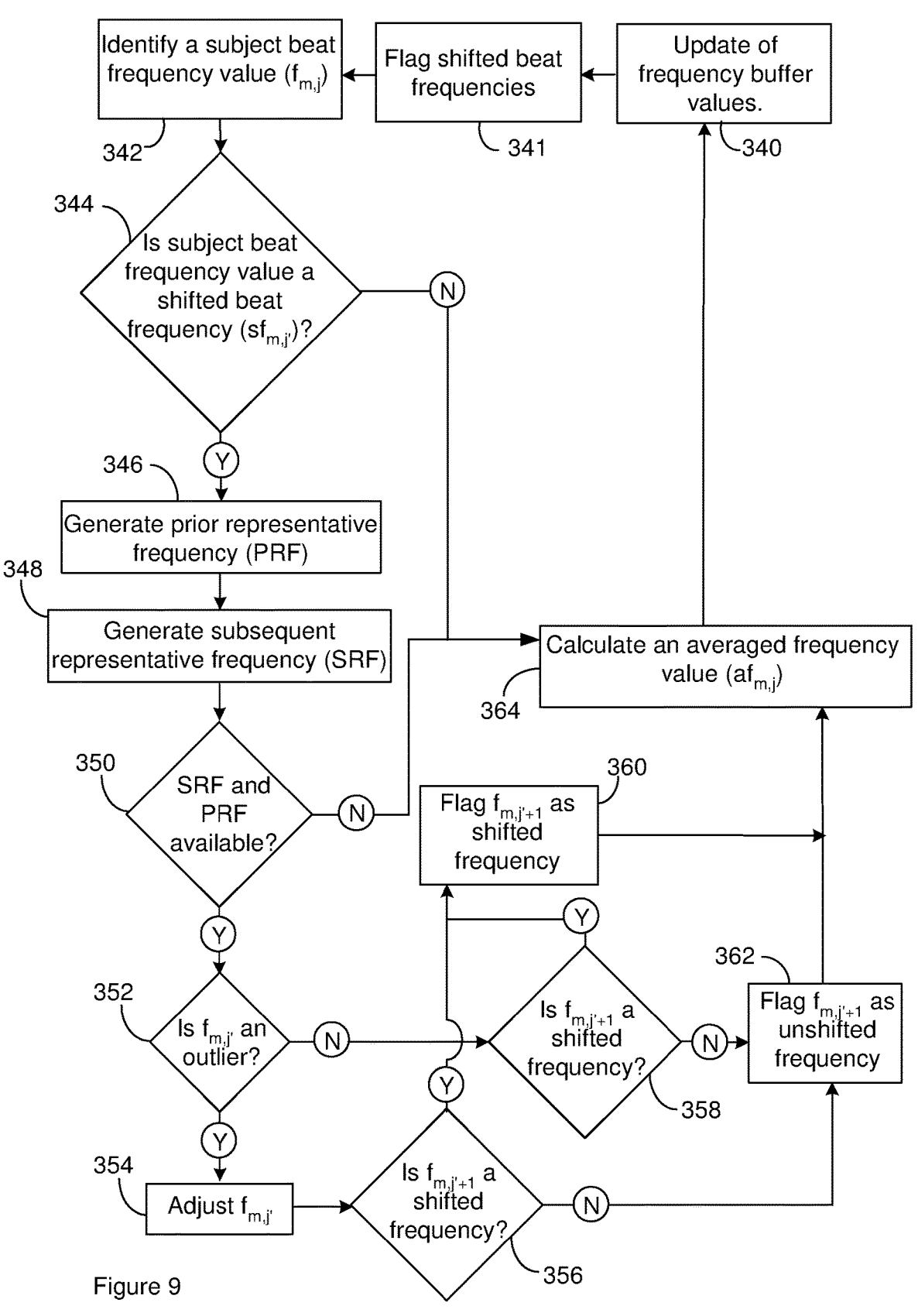
FIG. 9 illustrates an example of a process flow that is suitable for use as a first algorithm and/or as the second algorithm in the process flow of FIG. 7.

FIG. 9 illustrates an example of a process flow that is suitable for use as the first algorithm 314 and/or as the second algorithm 316. At process block 340, the data refinement component 272 can update the frequency buffer and the flag buffer to reflect the addition of the new beat frequency value ($f_{m,j}$) to the buffer elements. In response to the updating of the frequency buffer the data refinement component 272 can flag the beat frequency value ($f_{m,j}$) that has most recently been added to the frequency buffer as unshifted. For instance, the data refinement component 272 can set the flag associated with the beat frequency value that has most recently been added to the frequency buffer to the flag value associated with unshifted frequency values. In the example of FIG. 7, the beat frequency value $f_{m,j'+P}$ represents the beat frequency value that has most recently been added to the frequency buffer. Accordingly, the data refinement component 272 can set the flag $ff_{m,j'+P}$ to the flag value associated with unshifted frequency values.

The data refinement component 272 can proceed from process block 340 to process block 341 where the data refinement component 272 flags shifted beat frequencies. As described above, the beat frequency value $f_{m,j'+P}$ can have the associated flag ($ff_{m,j'+P}$) changed to the flag value associated with shifted frequency values when $|f_{m,j'+P}-f_{m,j'+P-1}|>\delta/2$. In this example, a beat frequency value becomes flagged as a shifted beat frequency value when it changes from the previous beat frequency value having the same period index by more than a threshold ($\delta/2$).

The data refinement component 272 can proceed from process block 341 to process block 342 where the data refinement component 272 identifies one of the beat frequency values ($f_{m,j}$) to serve as the subject beat frequency ($f_{m,j'}$) where j' represents the cycle index of the subject beat frequency ($f_{m,j'}$). As noted above, the data refinement component 272 can identify the beat frequency value ($f_{m,j}$) that occupies the center frequency buffer element to serve as the subject beat frequency ($f_{m,j'}$). Accordingly, the beat frequency value in frequency buffer element number P+1 can be selected to serve as the subject beat frequency. In the frequency buffer example of FIG. 7 at the time labeled t2, the beat frequency values ($f_{1,9}$) would be selected to serve as the subject beat frequency ($f_{m,j'}$).

The data refinement component 272 proceeds from process block 342 to determination block 344 where the data refinement component 272 determines whether the subject beat frequency ($f_{m,j'}$) is a shifted beat frequency. For instance, when the flag at $ff_{m,j'}$ is associated with shifted frequency values, the data refinement component 272 determines that the subject beat frequency ($f_{m,j'}$) is a shifted beat frequency. When the flag at $ff_{m,j'}$ is associated with unshifted frequency values, the data refinement component 272 determines that the subject beat frequency ($f_{m,j'}$) is an unshifted beat frequency.

The data refinement component 272 proceeds from determination block 344 to process block 346 where the data refinement component 272 generates the prior representative frequency (PRF). As noted above, the prior representative frequency can be a frequency value calculated so as to be representative of the beat frequency values that have the same data period index m as the subject beat frequency ($f_{m,j'}$) and that occur within a window before the subject beat frequency ($f_{m,j'}$). As will be discussed below, in some circumstances, the prior representative frequency (PRF) is flagged as available or as unavailable.

The data refinement component 272 proceeds from process block 346 to process block 348 where the data refinement component 272 generates the subsequent representative frequency. As noted above, the subsequent representative frequency (SRF) can be a frequency value calculated so as to be representative of the beat frequency values that have the same data period index m as the subject beat frequency ($f_{m,j'}$) and that occur within a window after the subject beat frequency ($f_{m,j'}$). As will be discussed below, in some circumstances, the subsequent representative frequency (SRF) is flagged as available or unavailable.

The data refinement component 272 proceeds from process block 348 to determination block 350 where the data refinement component 272 makes a determination whether both the subsequent representative frequency (SRF) and the prior representative frequency (PRF) are flagged as available.

When the data refinement component 272 determines that the SRF and PRF are available at determination block 350, the data refinement component 272 proceeds from determination block 350 to determination block 352. At process block 352, the data refinement component 272 determines whether the subject beat frequency ($f_{m,j'}$) is an outlier. The data refinement component 272 can apply the one or more outlier detection criteria to one or more components selected from the group consisting of the subject beat frequency ($f_{m,j'}$), the prior representative frequency, the subsequent representative frequency, and combinations thereof. The one or more outlier detection criteria is selected to indicate whether the subject beat frequency ($f_{m,j'}$) is an outlier. For instance, the data refinement component 272 can determine that the subject beat frequency ($f_{m,j'}$) is an outlier in response to a difference between the prior representative frequency and the subsequent representative frequency falling beneath a threshold. As an example, the data refinement component 272 can determine that the subject beat frequency ($f_{m,j'}$) is an outlier in response to $|SRF-PRF|\leq\delta/2$.

In response to the data refinement component 272 determining that the subject beat frequency ($f_{m,j'}$) is an outlier at determination block 352, the data refinement component 272 proceeds to process block 354 where the data refinement component 272 can adjust the value of the subject beat frequency ($f_{m,j'}$). For instance, the data refinement component 272 can set the value of the subject beat frequency ($f_{m,j'}$) to the value of the prior representative frequency (PRF). As a result, the subject beat frequency ($f_{m,j'}$), is adjusted such that value of ($f_{m,j'}$)=PRF.

The data refinement component 272 proceeds from process block 354 to determination block 356. At determination block 356, the data refinement component 272 determines whether the beat frequency value after the subject beat frequency ($f_{m,j'}$) should be flagged as a shifted beat frequency. As is evident from process block 340, the flag associated with the next beat frequency value (i.e. beat frequency value after the subject beat frequency ($f_{m,j'}$) value having the same period index m and represented by $f_{m,j'+1}$) can change in response to changes in the value of the subject beat frequency ($f_{m,j'}$). As a result, the flag associated with the next beat frequency value (i.e. $f_{m,j'+1}$) can be unreliable as a result of the adjustment to the shifted value of the subject beat frequency ($f_{m,j'}$) in process block 354.

The data refinement component 272 can determine that the next beat frequency value should be flagged as a shifted frequency value using a process analogous to the process disclosed in the context of process block 341. For instance, in response to $|PRF-f_{m,j'+1}|>\delta/2$, the data refinement component 272 can flag the next beat frequency value as a shifted frequency value or can leave the next beat frequency value flagged as a shifted frequency value at process block 360. When the subject beat frequency ($f_{m,j'}$) has been set equal to PRF at process block 354, the equation $|PRF-f_{m,j'+1}|>\delta/2$ can also be written as $|f_{m,j'}-f_{m,j'+1}|>\delta/2$ where the value of $f_{m,j'}$ represents the value of $f_{m,j'}$ as adjusted in process block 354.

In response to the data refinement component 272 determining that the shifted subject beat frequency ($f_{m,j'}$) is not an outlier at determination block 352, the data refinement component 272 proceeds to determination block 358. The determination that the subject beat frequency ($f_{m,j}$) is not an outlier can be a result of $|SRF-PRF|>\delta/2$. This condition indicates that the frequency shift associated with the subject beat frequency ($f_{m,j}$) is at an edge of a surface where the system output signal moves off the surface or onto the surface. Accordingly, the application of the $|SRF-PRF|>\delta/2$ condition to the representative frequency and the subsequent representative frequency amounts to an application of edge identification criteria to the beat frequencies. In the method data refinement process of FIG. 9, the shifted frequencies for which SRF and PRF are available are essentially treated as being an outlier or being positioned at an edge of a surface. As result, a shifted frequency for which SRF and PRF are available and that is not identified as an outlier is treated as being positioned at an edge. Accordingly, the one or more outlier identification criteria applied at determination block 352 also serves as edge identification criteria.

When the data refinement component 272 determines that subject beat frequency ($f_{m,j}$) is not an outlier determination block 352 and $|SRF-f_{m,j'}|>\delta/2$, the subject beat frequency ($f_{m,j'}$) is shifted relative to the surface (or lack of a surface) that is the source of the SRF value. The determination that the subject beat frequency ($f_{m,j}$) is not an outlier can be a result of $|SRF-PRF|>\delta/2$. The flag associated with the next beat frequency value (i.e. beat frequency value after the subject beat frequency having the same period index and represented by $f_{m,j'+1}$) is a function of the value of subject beat frequency ($f_{m,j}$) (see process block 341). As a result, the flag associated with the next beat frequency value (i.e. $f_{m,j'+1}$) can be unreliable as a result of the subject beat frequency ($f_{m,j}$) being shifted relative to the prior beat frequency value (i.e. beat frequency value before the subject beat frequency ($f_{m,j'}$) value having the same period index m and being represented by $f_{m,j'-1}$) and also being shifted relative to the surface (or lack of a surface) that is the source of the SRF value. To address this unreliability, the data refinement component 272 can compare the next beat frequency value (i.e. $f_{m,j'+1}$) to the SRF value to determine whether the next beat frequency value should be flagged as a shifted frequency value. For instance, the data refinement component 272 can determine that the next beat frequency value should be flagged as a shifted frequency value in response to $|SRF-f_{m,j'+1}|>\delta/2$. Accordingly, in response to $|SRF-f_{m,j'}|>\delta/2$ and $|SRF-f_{m,j'+1}|>\delta/2$, at process block 360 the data refinement component 272 can flag the next beat frequency value as a shifted frequency value or can leave the next beat frequency value flagged as a shifted frequency value.

The data refinement component 272 can proceed to process block 364 in response to a negative determination at determination block 344, a negative determination at determination block 350, a negative determination at determination block 356, or a negative determination at determination block 358. The data refinement component 272 can proceed to process block 364 from process block 360. At process block 364, the data refinement component 272 calculates an averaged frequency ($af_{m,j'}$) for the subject beat frequency value ($f_{m,j'}$). The average is calculated by averaging all or a portion of the beat frequency values ($f_{m,j}$) in an averaging window that extends from $f_{m,j'-(Q-1)/2}$ to $f_{m,j'+(Q-1)/2}$ where Q is the averaging depth. As example, FIG. 7 illustrates an averaging window labeled Q. In FIG. 7, the averaging window extends from beat frequency value $f_{1,6}$ to beat frequency value $f_{1,12}$.

In some instances, only a portion of the beat frequency values ($f_{m,j}$) in the averaging window are used in the calculation of the averaged frequency ($af_{m,j'}$). The data refinement components selects the beat frequency values ($f_{m,j}$) that are to be used in the calculation of the averaged frequency ($af_{m,j'}$) from among the beat frequency values ($f_{m,j}$) in the averaging window. For instance, the beat frequency values ($f_{m,j}$) that are in the window and satisfy the surface selection criteria $|f_{m,j}-f_{m,j'}|\leq\delta/2$ can be selected for use in calculating the averaged frequency ($af_{m,j'}$). As example, each of the beat frequency values from $f_{m,j'-(Q-1)/2}$ to $f_{m,j'+(Q-1)/2}$ that satisfy $|f_{m,j}-f_{m,j'}|\leq\delta/2$ can be used in calculating the averaged frequency ($af_{m,j'}$). Since the condition that $|f_{m,j}-f_{m,j'}|\leq\delta/2$ needs to be satisfied for each of the beat frequency values ($f_{m,j}$) to be used in calculating the averaged frequency ($af_{m,j'}$), in some instances, only a portion of the beat frequency values ($f_{m,j}$) that are in the window are actually used in calculating the averaged frequency ($af_{m,j'}$). In some instances, the subject beat frequency value ($f_{m,j'}$) is the only beat frequency value ($f_{m,j}$) used in calculating the averaged frequency ($af_{m,j'}$) and $f_{m,j}=af_{m,j'}$. In these instances, the subject beat frequency value ($f_{m,j'}$) is shifted relative to the beat frequency values ($f_{m,j}$) adjacent to the subject beat frequency value ($f_{m,j}$). As a result, the subject beat frequency value ($f_{m,j'}$) is used as the averaged frequency ($af_{m,j'}$) to avoid reducing the quality of the subject beat frequency value ($f_{m,j'}$) relative to its original value.

In the case of FIG. 7, each of the beat frequency values from $f_{1,6}$ to $f_{1,12}$ for which $|f_{1,j}-f_{1,9}|\leq\delta/2$ are used in calculating the averaged frequency ($af_{m,j'}$). In some instances, all or a portion of the beat frequency values identified for use in calculating the averaged frequency are the result of adjusting the value of the subject beat frequency ($f_{m,j'}$) such that $f_{m,j}=PRF$ as described in the context of process block 354. While the subject beat frequency ($f_{m,j'}$) falls within the averaging window and necessarily satisfies the $|f_{m,j}-f_{m,j'}|\leq\delta/2$, it is worth noting that the subject beat frequency ($f_{m,j'}$) is included in the beat frequency values ($f_{m,j}$) identified for use in calculating the averaged frequency ($af_{m,j'}$).

The averaged frequency ($af_{m,j'}$) can be a straight average, an arithmetic average or a weighted average of the beat frequency values ($f_{m,j}$) identified for use in calculating the averaged frequency ($af_{m,j'}$). When the averaged frequency ($af_{m,j}$) is a weighted average, the beat frequency values ($f_{m,j}$) closer in time to the subject beat frequency ($f_{m,j'}$) can be given more weight than beat frequency values ($f_{m,j}$) further in time from the subject beat frequency ($f_{m,j'}$).

The electronics can store the averaged frequency ($af_{m,j'}$) in the memory 271 for subsequent use by the LIDAR data generator 274 in calculating the LIDAR data as disclosed above.

The data refinement algorithm of FIG. 9 addresses the outlier distortions disclosed in the context of FIG. 6C because an outlying beat frequency value has its value adjusted at process block 354. Since its value is adjusted to the value of the prior representative frequency, the effect of outlying beat frequency value on the averaged beat frequency values is reduced or eliminated.

The use of the surface selection criteria $|f_{m,j}-f_{m,j'}|\leq\delta/2$ in selecting the beat frequency values ($f_{m,j}$) addresses the edge that is the source of the surface change disclosed in the context of FIG. 6B. The value of $\delta/2$ can be selected to approximate a lower or minimal level of frequency change that is a characteristic of the system output signal crossing an edge of an object. As a result, when $|f_{m,j}-f_{m,j'}|>\delta/2$, the value of $f_{m,j}$ is treated as a beat frequency value that does not result from the system output surface being incident on the surface that the system output signal was incident on to generate the subject frequency value $f_{m,j'}$. In contrast, the beat frequency values where $|f_{m,j}-f_{m,j'}|\leq\delta/2$ result from the system output signal being on the same surface. As a result, the surface selection criteria effectively causes the beat frequency values that are averaged so as to generate an averaged beat frequency value to be or at least approximate results of the system output signal illuminating the same surface. Since the beat frequency values that are averaged are from the same surface, the distortion of the averaged beat frequency values ($af_{m,j}$) disclosed in the context of FIG. 6B is removed or reduced.

The data refinement component 272 can return to process block 340 from process block 364.

As noted above, power level indicator ($P_{m,j}$) is an indicator of the power of the system return signal that can be stored in the memory 271. In addition, or as an alternative, to the calculation of the averaged beat frequency values ($af_{m,j}$) at process block 264, the data refinement component 272 can calculate an averaged power level indicator ($aP_{m,j}$) that are each associated with a data period, a beat frequency, and/or an averaged beat frequency. The electronics can treat an averaged power level indicator ($aP_{m,j}$) as the power level indicator for the associated data period, a beat frequency, and/or an averaged beat frequency. In some instances, once the electronics has calculated an averaged power level indicator ($aP_{m,j}$) the electronics can set the power level indicator ($P_{m,j}$) equal to the averaged power level indicator ($aP_{m,j}$).

The averaged power level indicator ($aP_{m,j}$) can be calculated analogously to the calculation of the averaged beat frequency values ($af_{m,j}$). For instance, each of the power level indicators ($P_{m,j}$) associated with a beat frequency value ($f_{m,j}$) that was selected for averaging into the averaged beat frequency values ($af_{m,j}$) can be selected for averaging into the averaged power level indicator ($aP_{m,j}$). As a result, the criteria that are used to identify the beat frequency values ($f_{m,j}$) that are to be averaged into an averaged beat frequency values ($af_{m,j}$) can also be used to identify the power level indicators ($P_{m,j}$) that are to be averaged into an averaged power level indicator ($aP_{m,j}$). The use of averaging to generate the power level indicator ($aP_{m,j}$) can reduce the effects of noise and increase the precision of the power estimates.

As with the averaging for the averaged beat frequency values ($af_{m,j}$), the averaging for the averaged power level indicators ($aP_{m,j}$) can be a straight average, an arithmetic average or a weighted average of the power level indicator ($P_{m,j}$) identified for use in calculating the averaged power level indicator ($aP_{m,j}$).

The averaged power level indicators ($aP_{m,j}$) can be used in a variety of different applications. For instance, different object materials cause the system output signal to be reflected at different power levels. Accordingly, averaged power level indicators ($aP_{m,j}$) can indicate what material is being illuminated by the system output signal or can be an indicator of what material is being illuminated by the system output signal. As a result, electronics can apply material identification criteria to the averaged power level indicators ($aP_{m,j}$) so as to classify, identify, and or characterize the material being illuminated by the system output signal. When the LIDAR system is used to guide a self-driving vehicle, the ability to distinguish between water, concrete or metal can be important. The averaged power level indicators ($aP_{m,j}$) can be used in making these sorts of distinctions in self-driving vehicles and other LIDAR applications.

Figure 10:
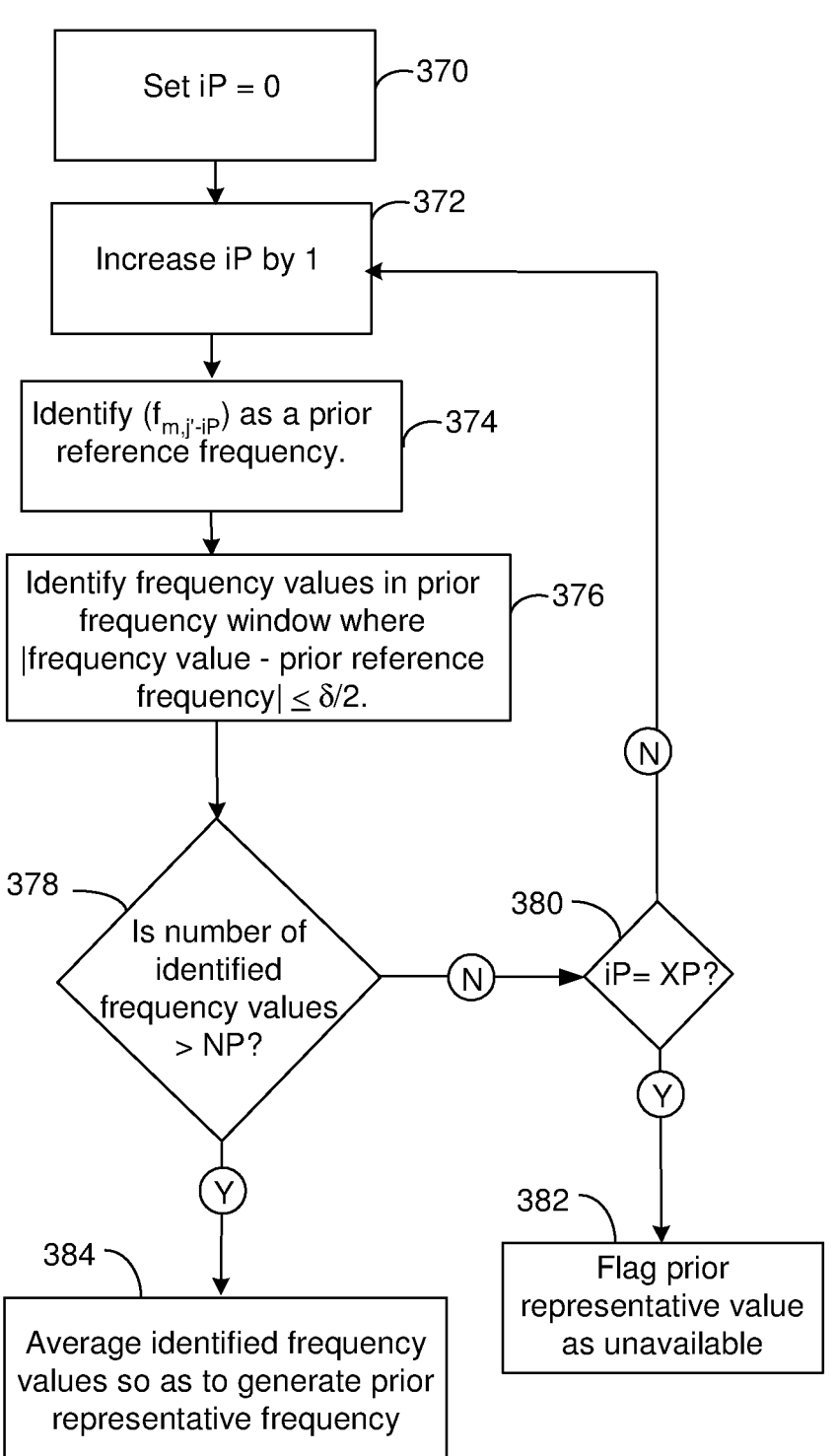
FIG. 10 is a flow diagram illustrating one possible method of calculating a prior representative frequency.

FIG. 10 is a flow diagram illustrating one possible method of calculating a prior representative frequency. At process block 370, the data refinement component 272 can initiate the method by setting a counter (IP) to zero. Additionally, the data refinement component 272 can flag the prior representative value as available.

The data refinement component 272 can proceed from process block 370 to process block 372 where the data refinement component 272 increases the value of the counter (IP) by 1.

The data refinement component 272 can proceed from process block 372 to process block 374 where the data refinement component 272 identifies a prior reference frequency. For instance, the data refinement component 272 can identify the beat frequency that has the same period index as the subject frequency and occurs IP beat frequencies before the subject beat frequency as the prior reference frequency. As an example, the data refinement component 272 can identify the beat frequency ($f_{m,j-IP}$) as the prior reference frequency (PF).

The data refinement component 272 can proceed from process block 374 to process block 376 where the data refinement component 272 identifies the frequency values ($f_{m,j}$) that are located in a prior frequency window and for which $|f_{m,j}-PF|\leq\delta/2$. The prior frequency window can include frequency values ($f_{m,j}$) that occur before the subject frequency ($f_{m,j'}$). In one example, the prior frequency window extends from frequency value ($f_{m,j'-XP}$) to frequency value ($f_{m,j'-1}$) where XP is a positive integer that is greater than 1 and less than or equal to P. Accordingly, the data refinement component 272 can identify the frequency values from ($f_{m,j'-XP}$) to ($f_{m,j'-1}$) for which $|f_{m,j}-PF|\leq\delta/2$. In one example, XP=P. Limiting the identified frequency values ($f_{m,j}$) to values for which $|f_{m,j}-PF|\leq\delta/2$ serves as the standard deviation reduction algorithm that reduces the standard deviation of the frequency values ($f_{m,j}$) that are used in calculating the prior representative frequency.

The data refinement component 272 can proceed from process block 376 to determination block 378 where a determination is made whether the number of frequency values ($f_{m,j}$) identified at process block 376 is greater than or equal to NP where NP is a positive integer greater than or equal to 1. NP can serve as a minimum number of frequency values ($f_{m,j}$) that need to be identified in order to proceed with the calculation of the prior representative frequency.

When the determination at determination block 378 is negative, the data refinement component 272 can proceed from determination block 378 to determination block 380 where a determination is made as to whether IP=XP. When the determination at determination block 380 is negative, the data refinement component 272 can return to process block 372 and the method repeated with a different beat frequency value serving as the prior reference frequency.

When the determination at determination block 380 is positive, the data refinement component 272 can proceed to block 382 where the prior representative frequency is flagged as unavailable.

When the determination at determination block 378 is positive, the data refinement component 272 can proceed from determination block 378 to process block 384 where the prior representative value can be calculated. The prior representative value can be an average of the frequency values ($f_{m,j}$) identified at process block 376. The frequency value serving as the prior reference frequency necessarily satisfies $|f_{m,j}-PF|\leq\delta/2$ and is accordingly one of the frequency values ($f_{m,j}$) identified at process block 376. The average frequency values can be a straight average, an arithmetic average, or a weighted average. For instance, the frequency values ($f_{m,j}$) identified at process block 376 that are closer in time to the subject beat frequency ($f_{m,j'}$) can be given more weight than beat frequency values ($f_{m,j}$) further in time from the subject beat frequency ($f_{m,j'}$). The prior reference frequency remains flagged as available.

Figure 11:
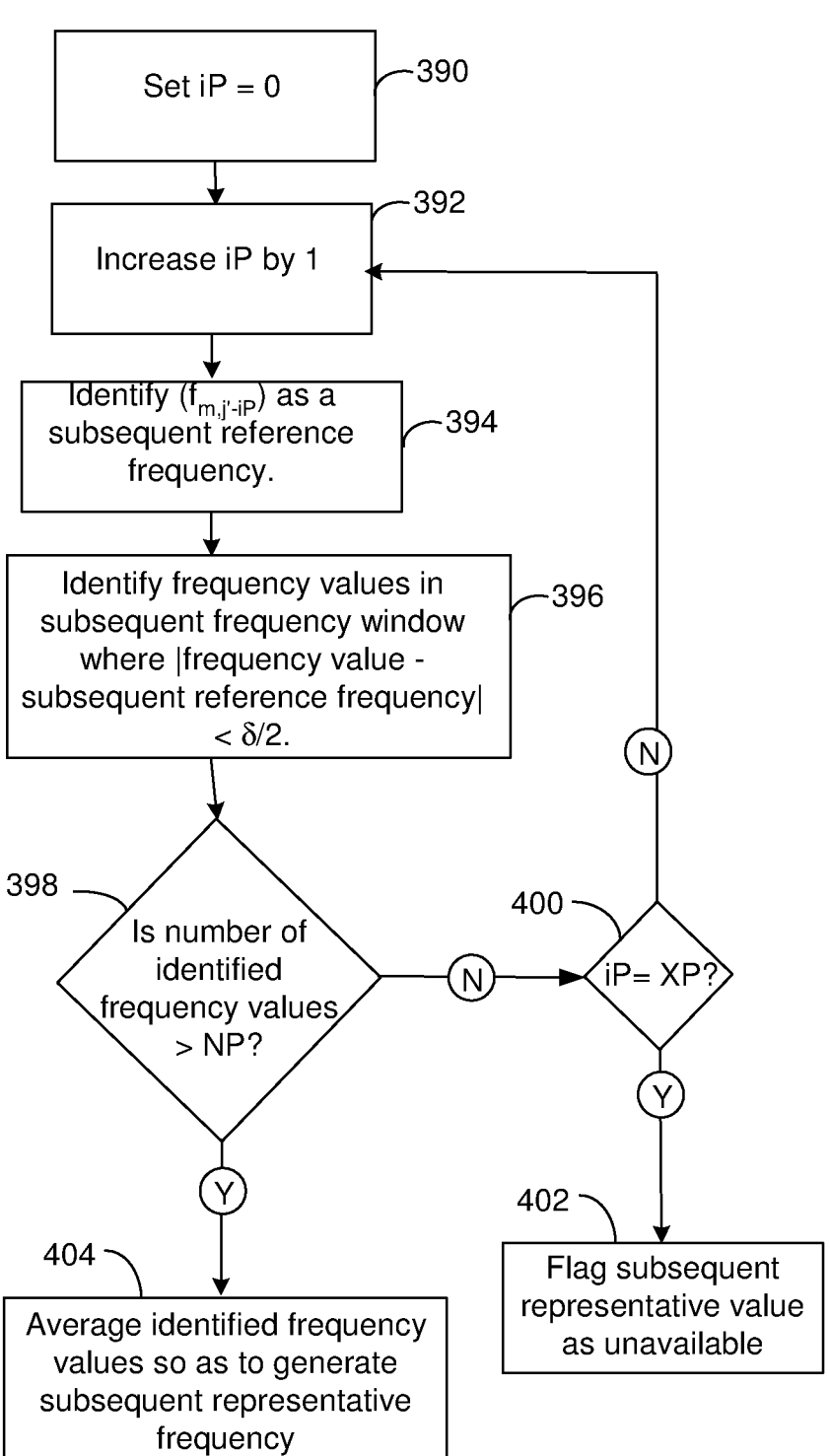
FIG. 11 is a flow diagram illustrating one possible method of calculating a subsequent representative frequency.

FIG. 11 is a flow diagram illustrating one possible method of calculating a subsequent representative frequency. At process block 390, the data refinement component 272 can initiate the method by setting a counter (IP) to zero. Additionally, the data refinement component 272 can flag the subsequent representative value as available.

The data refinement component 272 can proceed from process block 390 to process block 392 where the data refinement component 272 increases the value of the counter (IP) by 1.

The data refinement component 272 can proceed from process block 392 to process block 394 where the data refinement component 272 identifies a subsequent reference frequency. For instance, the data refinement component 272 can identify the beat frequency that has the same period index as the subject frequency ($f_{m,j'}$) and occurs IP beat frequencies after the subject beat frequency as the subsequent reference frequency. As an example, the data refinement component 272 can identify the beat frequency ($f_{m,j+IP}$) as the subsequent reference frequency (SF).

The data refinement component 272 can proceed from process block 394 to process block 396 where the data refinement component 272 identifies the frequency values ($f_{m,j}$) that are located in a subsequent frequency window and for which $|f_{m,j}-SF|\leq\delta/2$. The subsequent frequency window can include frequency values ($f_{m,j}$) that occur after the subject frequency ($f_{m,j'}$). In one example, the subsequent frequency window extends from frequency value ($f_{m,j'+1}$) to frequency value ($f_{m,j'+XP}$) where XP is a positive integer that is greater than 1 and less than or equal to P. Accordingly, the data refinement component 272 can identify the frequency values from ($f_{m,j'+1}$) to ($f_{m,j'+XP}$) for which $|f_{m,j}-SF|\leq\delta/2$. In one example, XP=P. Limiting the identified frequency values ($f_{m,j}$) to values for which $|f_{m,j}-SF|\leq\delta/2$ serves as the standard deviation reduction algorithm that reduces the standard deviation of the frequency values ($f_{m,j}$) that are used in calculating the prior representative frequency.

The data refinement component 272 can proceed from process block 396 to determination block 398 where a determination is made whether the number of frequency values ($f_{m,j}$) identified at process block 396 is greater than or equal to NP where NP is a positive integer greater than or equal to 1. NP can serve as a minimum number of frequency values ($f_{m,j}$) that need to be identified in order to proceed with the calculation of the subsequent representative frequency.

When the determination at determination block 398 is negative, the data refinement component 272 can proceed from determination block 398 to determination block 400 where a determination is made as to whether IP=XP. When the determination at determination block 400 is negative, the data refinement component 272 can return to process block 392 and the method repeated with a different beat frequency value serving as the subsequent reference frequency (SF).

When the determination at determination block 400 is positive, the data refinement component 272 can proceed to block 402 where the subsequent representative frequency is flagged as unavailable.

When the determination at determination block 398 is positive, the data refinement component 272 can proceed from determination block 398 to process block 404 where the subsequent representative value can be calculated. The subsequent representative value can be an average of the frequency values ($f_{m,j}$) identified at process block 396. The frequency value serving as the subsequent reference frequency (SF) necessarily satisfies $|f_{m,j}-SF|\leq\delta/2$ and is accordingly one of the frequency values ($f_{m,j}$) identified at process block 396. The average frequency values can be a straight average, an arithmetic average, or a weighted average. For instance, the frequency values ($f_{m,j}$) identified at process block 396 that are closer in time to the subject beat frequency ($f_{m,j'}$) can be given more weight than beat frequency values ($f_{m,j}$) further in time from the subject beat frequency ($f_{m,j'}$). The subsequent reference frequency remains flagged as available.

Figure 12:
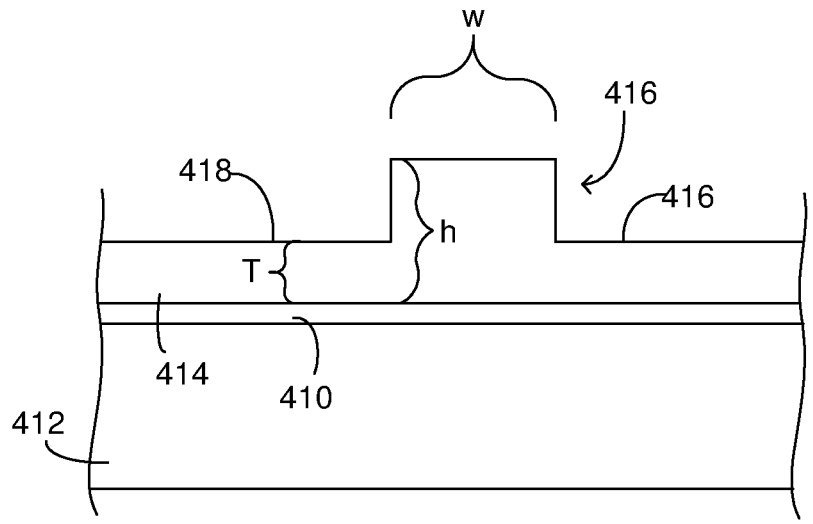
FIG. 12 is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 12 is a cross-section of portion of a chip constructed from a silicon-on-insulator wafer. A silicon-on-insulator (SOI) wafer includes a buried layer 410 between a substrate 412 and a light-transmitting medium 414. In a silicon-on-insulator wafer, the buried layer 410 is silica while the substrate 412 and the light-transmitting medium 414 are silicon. The substrate 412 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 412.

The portion of the chip illustrated in FIG. 12 includes a waveguide construction that is suitable for use in LIDAR chips constructed from silicon-on-insulator wafers. A ridge 416 of the light-transmitting medium 414 extends away from slab regions 418 of the light-transmitting medium. The light signals are constrained between the top of the ridge 416 and the buried oxide layer 410.

The dimensions of the ridge waveguide are labeled in FIG. 12. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 12 is suitable for all or a portion of the waveguides on LIDAR chips constructed according to FIG. 1A through FIG. 1C.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108, 8472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Although the imaging system is disclosed in the context of a LIDAR system having a LIDAR chip, the disclosed data refinement can be used in conjunction with other LIDAR systems.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:

an imaging system configured to output a system output signal during multiple associated data periods, a frequency of the system output signal as a function of time being repeated during each of the associated data periods;

the LIDAR system including a light-combiner that combines light that returns to the LIDAR system from the system output signal with light from a reference signal so as to generate beating signals that are each beating at a beat frequency, each of the beat frequencies being associated with a different one of the data periods; and electronics that calculate averaged frequencies that are each an average of multiple different beat frequencies and each of the averaged frequencies are associated with a different one of the beat frequencies, the beat frequencies being averaged so as to calculate
a subject one of the averaged frequencies from
beat frequencies selected from beat frequencies in
an averaging window,
the electronics applying a surface selection criteria to
the beat frequencies in the averaging window so as
to identify the beat frequencies that are each a
result of the system output signal illuminating the
same surface on an object, and
the electronics calculating LIDAR data from the
averaged frequencies, the LIDAR data indicating
a radial velocity and/or distance between the
LIDAR system and an object outside of the
LIDAR system.

2. The system of claim 1, wherein a number of beat
frequencies that are averaged to calculate each of the aver-
aged beat frequency is different for different averaged beat
frequencies.

3. The system of claim 1, wherein each of the beat
frequencies has a beat frequency value and the electronics
adjust each beat frequency value of a portion of the beat
frequencies to an adjusted value that is different from the
value of the beat frequency of the beating signal.

4. The system of claim 3, wherein at least a portion of the
beat frequencies that are averaged to calculate one or more
of the averaged beat frequencies have the adjusted value
rather than the value of the beat frequency of the beating
signal.

5. The system of claim 3, wherein a portion of the beat
frequency values that are adjusted to one of the adjusted
values are outliers and the electronics adjust the beat fre-
quency value of each outlier in response to the beat fre-
quency value being an outlier.

6. The system of claim 3, wherein the electronics are
configured to apply one or more outlier identification criteria
to the beat frequencies so as to identify beat frequencies that
are outliers.

7. The system of claim 1, wherein
the beat frequencies selected from the averaging window
are selected such that a magnitude of a difference
between each of the selected beat frequencies and a
subject one of the beat frequencies is less than a
threshold,
the beat frequencies that are in the window but result in
the magnitude of the difference being greater than the
threshold are excluded from the beat frequencies that
are averaged so as to calculate the subject averaged
frequencies, and
the subject beat frequency being the beat frequency
associated with the subject averaged frequency.

8. The system of claim 1, wherein a number of beat
frequencies that are averaged to calculate at least a portion
of the averaged frequencies are between 3 and 19.

9. A method of operating an imaging system, comprising:
outputting from the imaging system a system output
signal during multiple associated data periods,
a frequency of the system output signal as a function of
time being repeated during each of the associated
data periods;
combining light that returns to the LIDAR system from
the system output signal with light from a reference signal so as to generate beating signals that are each
beating at a beat frequency,
each of the beat frequencies being associated with a
different one of the data periods;
calculating averaged frequencies that are each an average
of multiple different beat frequencies and each of the
averaged frequencies are associated with a different one
of the beat frequencies,
the beat frequencies being averaged so as to calculate
a subject one of the averaged frequencies from beat
frequencies selected from the beat frequencies in an
averaging window,
applying a surface selection criteria to the beat frequen-
cies in the averaging window so as to identify the beat
frequencies that are each a result of the system output
signal illuminating the same surface on an object; and
calculating LIDAR data from the averaged frequencies,
the LIDAR data indicating a radial velocity and/or
distance between the LIDAR system and an object
outside of the LIDAR system.

10. The method of claim 9, wherein a number of beat
frequencies that are averaged to calculate each of the aver-
aged beat frequency is different for different averaged beat
frequencies.

11. The method of claim 9, wherein each of the beat
frequencies has a value and further comprising:
adjusting each beat frequency value of a portion of the
beat frequencies to an adjusted value that is different
from the value of the beat frequency of the beating
signal.

12. The method of claim 11, wherein at least a portion of
the beat frequencies that are averaged to calculate one or
more of the averaged beat frequencies have the adjusted
value rather than the value of the beat frequency of the
beating signal.

13. The method of claim 11, wherein a portion of the beat
frequency values that are adjusted to one of the adjusted
values are outliers and the beat frequency value of each
outlier is adjusted in response to the beat frequency value
being an outlier.

14. The method of claim 11, further comprising:
applying one or more outlier identification criteria to the
beat frequencies so as to identify beat frequencies that
are outliers.

15. The method of claim 9, wherein
the beat frequencies selected from the averaging window
are selected such that a magnitude of a difference
between each of the selected beat frequencies and a
subject one of the beat frequencies is less than a
threshold,
the beat frequencies that are in the window but result in
the magnitude of the difference being greater than the
threshold are excluded from the beat frequencies that
are averaged so as to calculate the subject averaged
frequencies, and
the subject beat frequency being the beat frequency
associated with the subject averaged frequency.

16. The method of claim 9, wherein a number of beat
frequencies that are averaged to calculate at least a portion
of the averaged frequencies are between 3 and 19.

* * * * *